(12) United States Patent
Anguiano

(10) Patent No.: US 12,167,097 B2
(45) Date of Patent: Dec. 10, 2024

(54) SYSTEMS AND METHODS FOR FACILITATING CONTENT DISCOVERY BASED ON AUGMENTED CONTEXT

(71) Applicant: DISH Technologies L.L.C., Englewood, CO (US)

(72) Inventor: Jason Michael Anguiano, Castle Rock, CO (US)

(73) Assignee: DISH Technologies L.L.C., Englewood, CO (US)

(*) Notice: Subject to any disclaimer, the term of this patent is extended or adjusted under 35 U.S.C. 154(b) by 0 days.

(21) Appl. No.: 17/977,293

(22) Filed: Oct. 31, 2022

(65) Prior Publication Data

US 2023/0058878 A1 Feb. 23, 2023

Related U.S. Application Data

(63) Continuation of application No. 16/670,797, filed on Oct. 31, 2019, now Pat. No. 11,496,808, which is a (Continued)

(51) Int. Cl.
*H04N 21/482* (2011.01)
*G06T 1/00* (2006.01)
(Continued)

(52) U.S. Cl.
CPC ....... *H04N 21/4821* (2013.01); *G06T 1/0007* (2013.01); *H04N 21/25891* (2013.01); *H04N 21/4147* (2013.01); *H04N 21/4223* (2013.01); *H04N 21/4312* (2013.01); *H04N 21/44008* (2013.01); *H04N 21/4532* (2013.01); *H04N 21/4826* (2013.01); *H04N 21/816* (2013.01)

(58) Field of Classification Search
CPC ......... H04N 21/4821; H04N 21/25891; H04N 21/4147; H04N 21/4223; H04N 21/4312; H04N 21/44008; H04N 21/4532; H04N 21/4826; H04N 21/816; G06T 1/0007
See application file for complete search history.

(56) References Cited

U.S. PATENT DOCUMENTS 8,964,298 B2 2/2015 Haddick et al.
9,282,367 B2 3/2016 Daub
(Continued)

*Primary Examiner* — Randy A Flynn
(74) *Attorney, Agent, or Firm* — Kilpatrick Townsend & Stockton LLP

(57) ABSTRACT

Method, systems, and computer-readable media are provided to facilitate content discovery based on augmented context. A first set of images of a graphical display may be acquired and analyzed to identify visual characteristics of an object represented. Attributes of the object may be identified. Specifications may be transmitted to the television receiver and/or a remote data source in order to pull matching information. A user-selectable interface element may be generated for presentation as an option to take an action relating to the object represented. A visual output of the interface element may be output as an overlay on the first set and/or a second set of images displayed by the computing device. A user selection responsive to the outputting of the visual output of the at interface element may be processed. A communication may be transmitted to the television receiver to cause the action responsive to the user selection.

17 Claims, 8 Drawing Sheets

Related U.S. Application Data continuation of application No. 15/395,235, filed on Dec. 30, 2016, now Pat. No. 10,511,892.

(51) Int. Cl.
  *H04N 21/258* (2011.01)
  *H04N 21/4147* (2011.01)
  *H04N 21/4223* (2011.01)
  *H04N 21/431* (2011.01)
  *H04N 21/44* (2011.01)
  *H04N 21/45* (2011.01)
  *H04N 21/81* (2011.01)

(56) References Cited

U.S. PATENT DOCUMENTS

| | | | |
|---|---|---|---|
| 9,465,451 | B2 | 10/2016 | Krukar et al. |
| 10,438,262 | B1* | 10/2019 | Helmer .................. H04N 7/185 |
| 10,511,892 | B2 | 12/2019 | Anguiano |
| 2002/0104088 | A1 | 8/2002 | McGee, III et al. |
| 2007/0124775 | A1 | 5/2007 | DaCosta et al. |
| 2010/0046842 | A1 | 2/2010 | Conwell |
| 2011/0242133 | A1* | 10/2011 | Greaves .................. G06F 16/44 |
| | | | 345/633 |
| 2011/0295693 | A1 | 12/2011 | Clavin et al. |
| 2012/0291073 | A1 | 11/2012 | Friedman |
| 2012/0311623 | A1 | 12/2012 | Davis et al. |
| 2013/0019250 | A1 | 1/2013 | Ng et al. |
| 2013/0260360 | A1* | 10/2013 | Baurmann ................ G06F 3/14 |
| | | | 434/365 |
| 2013/0282532 | A1 | 10/2013 | Shihadah et al. |
| 2014/0020005 | A1* | 1/2014 | Amselem ......... H04N 21/44008 |
| | | | 725/19 |
| 2014/0237495 | A1 | 8/2014 | Jang et al. |
| 2014/0245335 | A1 | 8/2014 | Holden et al. |
| 2014/0267770 | A1 | 9/2014 | Gervautz et al. |
| 2014/0317659 | A1 | 10/2014 | Yasutake |
| 2015/0015784 | A1 | 1/2015 | Minnick et al. |
| 2015/0195626 | A1* | 7/2015 | Lee .................... H04N 21/4722 |
| | | | 725/34 |
| 2015/0316985 | A1* | 11/2015 | Levesque ................ G06F 3/016 |
| | | | 345/156 |
| 2015/0348329 | A1* | 12/2015 | Carre ............... H04N 21/42202 |
| | | | 345/633 |
| 2016/0019618 | A1 | 1/2016 | Lin et al. |
| 2016/0088358 | A1 | 3/2016 | Garcia |
| 2017/0006356 | A1* | 1/2017 | Krasadakis ........ H04N 21/4532 |
| 2017/0026707 | A1 | 1/2017 | Yoo et al. |
| 2018/0024845 | A1 | 1/2018 | Card et al. |

* cited by examiner

SYSTEMS AND METHODS FOR FACILITATING CONTENT DISCOVERY BASED ON AUGMENTED CONTEXT

CROSS-REFERENCES TO RELATED APPLICATIONS

This application is a continuation of U.S. application Ser. No. 16/670,797, filed Oct. 31, 2019, which is a continuation of U.S. application Ser. No. 15/395,235, filed Dec. 30, 2016, now issued as U.S. Pat. No. 10,511,892. The entire disclosure of the aforementioned U.S. Patent Applications is hereby incorporated by reference, for all purposes, as if fully set forth herein.

BACKGROUND

This disclosure generally relates to systems and methods of content discovery, and more particularly to systems and methods for facilitating content discovery based at least in part on augmented context.

Users of televisions and other video distribution platforms now have more options than ever to view content. For example, in addition to live broadcasts of content and local recordings of content (e.g., using a digital video recorder), content may be accessible from various sources via a network (e.g., the Internet). However, with the proliferation of content, a viewer can encounter a number of difficulties. Chief among the difficulties is the amount of time and effort necessary to search for particular content of interest. The options can be overwhelming to many users and can make process of locating content of interest difficult and inefficient. Viewers are in need of better viewer experiences and more tailored service offerings.

Thus, there is a need for systems and methods that address the foregoing problems in order to provide viewers with better experiences. This and other needs are addressed by the present disclosure.

BRIEF SUMMARY

Certain embodiments of the present disclosure relate generally to systems and methods of content discovery, and more particularly to systems and methods for facilitating content discovery based at least in part on augmented context.

In one aspect, a method is disclosed. The method may include performing one or a combination of the following. A first set of one or more images of a graphical display may be acquired using an image capture device. The graphical display may correspond to a presentation displayed by a display device that is different from a computing device. The first set of one or more images may be analyzed to identify one or more visual characteristics of an object represented by the first set of one or more images. Based at least in part on the one or more visual characteristics of the object, one or more attributes of the object may be identified. One or more specifications of the one or more attributes of the object may be transmitted to the television receiver and/or a remote data source. Information, that matches the one or more specifications, may be pulled from the television receiver and/or the remote data source. Based at least in part on the information, at least one user-selectable interface element may be generated for presentation with the computer device. The at least one user-selectable interface element may correspond to an option to take an action relating to the object represented by the first set of one or more images. A visual output of the at least one user-selectable interface element may be output as an overlay on the first set of one or more images and/or a second set of one or more images displayed by the computing device. The second set of one or more images may be based at least in part on further image acquisition of the graphical display using the image capture device. A user selection responsive to the outputting of the visual output of the at least one user-selectable interface element may be processed. A communication may be transmitted to the television receiver to cause the action responsive to the user selection.

In another aspect, a system is disclosed. The system may include a computing device configured to communicatively couple to a television receiver. The computing device may include one or more processors and a memory communicatively coupled with and readable by the one or more processors and having stored therein processor-readable instructions which, when executed by the one or more processors, cause the computing device to perform one or a combination of the following. A first set of one or more images of a graphical display may be acquired using an image capture device. The graphical display may correspond to a presentation displayed by a display device that is different from a computing device. The first set of one or more images may be analyzed to identify one or more visual characteristics of an object represented by the first set of one or more images. Based at least in part on the one or more visual characteristics of the object, one or more attributes of the object may be identified. One or more specifications of the one or more attributes of the object may be transmitted to the television receiver and/or a remote data source. Information, that matches the one or more specifications, may be pulled from the television receiver and/or the remote data source. Based at least in part on the information, at least one user-selectable interface element may be generated for presentation with the computer device. The at least one user-selectable interface element may correspond to an option to take an action relating to the object represented by the first set of one or more images. A visual output of the at least one user-selectable interface element may be output as an overlay on the first set of one or more images and/or a second set of one or more images displayed by the computing device. The second set of one or more images may be based at least in part on further image acquisition of the graphical display using the image capture device. A user selection responsive to the outputting of the visual output of the at least one user-selectable interface element may be processed. A communication may be transmitted to the television receiver to cause the action responsive to the user selection.

In yet another aspect, one or more non-transitory, machine-readable media are disclosed. The one or more non-transitory, machine-readable media may have instructions thereon which, when executed by one or more processing devices, cause the one or more processing devices to perform one or a combination of the following. A first set of one or more images of a graphical display may be acquired using an image capture device. The graphical display may correspond to a presentation displayed by a display device. The first set of one or more images may be analyzed to identify one or more visual characteristics of an object represented by the first set of one or more images. Based at least in part on the one or more visual characteristics of the object, one or more attributes of the object may be identified. One or more specifications of the one or more attributes of the object may be transmitted to the television receiver and/or a remote data source. Information, that matches the one or more specifications, may be pulled from the television receiver and/or the remote data source. Based at least in part on the information, at least one user-selectable interface element may be generated for presentation with the computer device. The at least one user-selectable interface element may correspond to an option to take an action relating to the object represented by the first set of one or more images. A visual output of the at least one user-selectable interface element may be output as an overlay on the first set of one or more images and/or a second set of one or more images displayed by the computing device. The second set of one or more images may be based at least in part on further image acquisition of the graphical display using the image capture device. A user selection responsive to the outputting of the visual output of the at least one user-selectable interface element may be processed. A communication may be transmitted to the television receiver to cause the action responsive to the user selection.

In various embodiments, the information pulled may indicate a set of one or more programming events matching the one or more specifications, and availability of one or more viewing options for the set of one or more programming events. In various embodiments, the action relating to the object may include recording at least one of the set of one or more programming events matching the one or more specifications. And the communication transmitted to the television receiver may cause a recorder to record the at least one of the set of one or more programming events.

In various embodiments, the information pulled corresponds to content, from the remote data source, matching the one or more specifications, wherein content represents a set of one or more commercial products matching the one or more specifications.

In various embodiments, one or more user interests may be inferred based at least in part on the user selection responsive to the outputting of the visual output of the at least one user-selectable interface element. And a second communication may be transmitted to the television receiver to cause a second action based at least in part on the one or more user interests inferred. The second action may include customizing an electronic programming guide so that upcoming programming events are graphically distinguished based at least in part on the one or more user interests inferred. The second action may include a recorder recording a set of one or more programming events based at least in part on the one or more user interests inferred.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
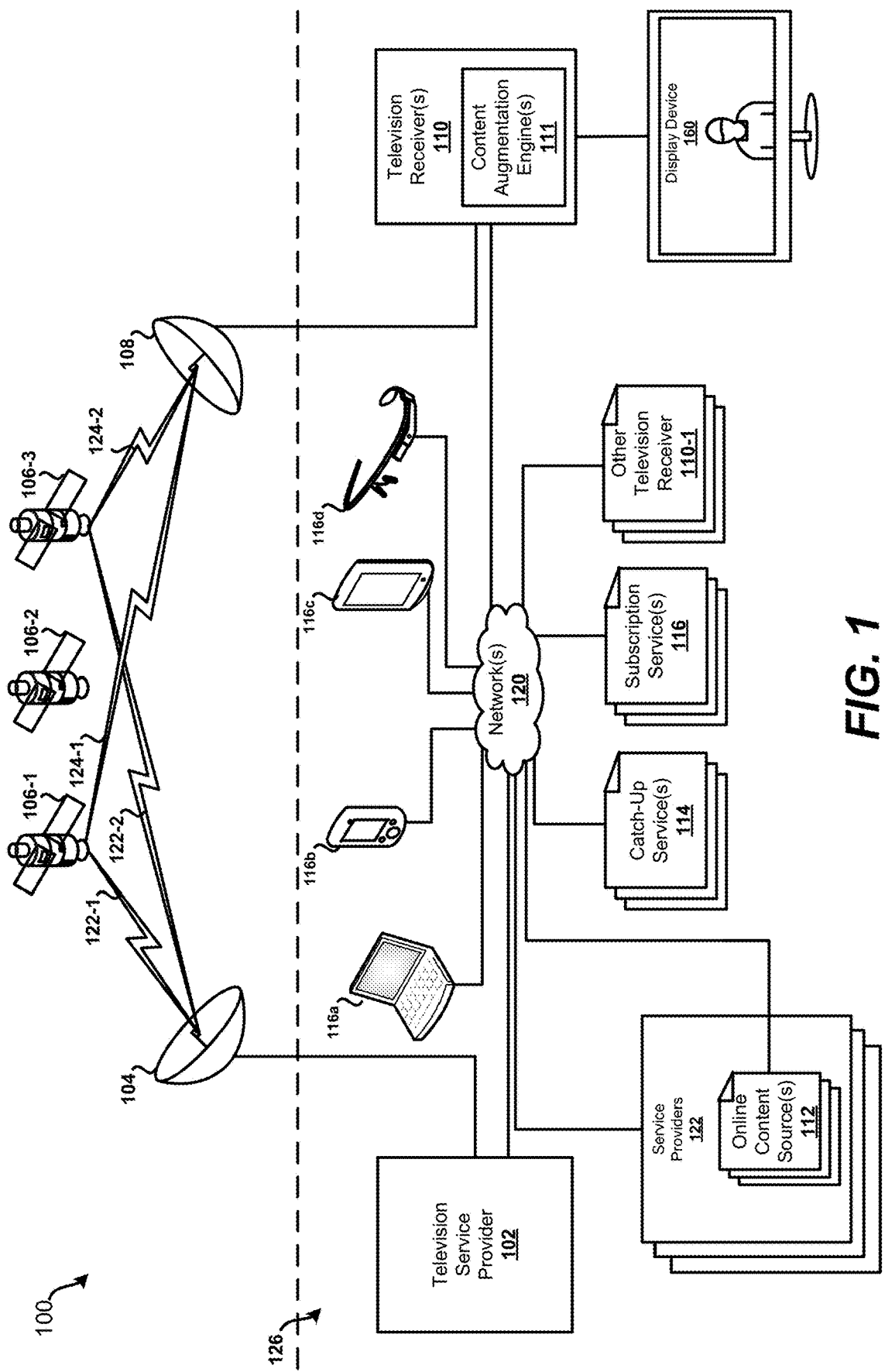
FIG. 1 illustrates a television programming distribution system, in accordance with certain embodiments of the present disclosure.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Certain embodiments according to the present disclosure may facilitate content discovery based at least in part on augmented context. Certain embodiments may utilize facial and object recognition technology to recognize actors and/or objects (e.g., products) in scenes of programming content (e.g., a television program, a movie, a commercial, a video clip, etc.) displayed on a display device (e.g., a television, a monitor, etc.) that a user captures with a camera of a computing device while the user is viewing the programming content. Based at least in part on recognized actors/characters and/or objects, certain embodiments may pull, from a remote data source through the cloud, content that is pertinent to the recognized actors/characters and/or objects. Certain embodiments may utilize the captured image data and the pulled content to generate and present augmented reality on the computing device to display the actor and/or object with an augmented reality overlay of content on images currently captured with the camera of the computing device.

Certain embodiments may generate and present user-selectable options to take actions pertinent to the recognized actors and/or objects (e.g., to find more movies and shows with that actor, to purchase the product from an online vendor, and/or the like). In certain embodiments, the computing device may communicate with a television receiver to pull information (e.g., electronic programming guide information and/or other schedule information) and generate and present an augmented reality overlay based at least in part on the pulled information. Certain embodiments may further generate user-selectable options for presentation on the computing device and/or an electronic programming guide to prompt a user to schedule recordings of discovered programs that are related to the recognized actors and/or objects. In some embodiments, the computing device may communicate with the receiver to customize the electronic programming guide so that upcoming programming content is flagged based at least in part on interests of the user inferred from augmented reality selections. With some embodiments, the computing device may communicate with the receiver to automatically create recording settings to record programs based at least in part on the augmented reality and selections made therewith.

In some embodiments, the computing device may use the recognized actors and/or objects and the pulled content to generate augmented reality to facilitate product placement in the home (e.g., captures a fridge, pulls options for fridges, displays the fridge options as overlay on images of kitchen being captured by the camera of the mobile device). In some embodiments, the computing device may use the recognized actors and/or objects and the pulled content to generate augmented reality to facilitate projections of captured images and masks based at least in part on the recognized actors and/or objects. Some embodiments may further provide for the computing device to casts image to the receiver, and the receiver may use the images for overlays with programming content.

Various embodiments will now be discussed in greater detail with reference to the accompanying figures, beginning with FIG. 1.

FIG. 1 illustrates an embodiment of a television program distribution system 100. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The system 100 may include television service provider 102, satellite uplink 104, a plurality of orbiting (e.g., geosynchronous) satellites 106, satellite receiver 108, television receivers 110, one or more contents sources 112 (e.g., online content sources), one or more catch-up services 114, one or more subscription services 116, one or more (other) television receivers 110-1, computing devices 116a-d, and service providers 122 (e.g., online service providers). In some embodiments, the television receiver 110 may include a content augmentation engine 111. In some embodiments, the content augmentation engine 111 may be configured to access multiple local and remote content resources and facilitate various content discovery features in accordance with various embodiments disclosed herein.

System 100 may include one or more networks 120 that can be used for a bi-directional communication path for data transfer with television receivers 110 and other components of system 100. The network 120 is intended to represent any number of terrestrial and/or non-terrestrial networks and/or network features. For example, network 120 may incorporate or exhibit any number of features or elements of various wireless and/or hardwired packet-based communication networks such as, for example, a WAN (Wide Area Network) network (e.g., the Internet), a HAN (Home Area Network) network, a LAN (Local Area Network) network (e.g., a corporate LAN), a WLAN (Wireless Local Area Network) network, a cellular communications network, and/or any other type of communication network(s) configured such that data may be transferred between and among respective elements of the example system 100.

The television receivers 110, as described throughout, may generally be any type of television receiver (such as an STB (set-top box), for example) configured to decode signals received for output and presentation via a display device 160. In another example, television receiver 110 (which may include another remote television receiver, such as a television receivers 110-1) may be integrated as part of or into a television, a DVR, a computing device, such as a tablet computing device, or any other computing system or device, as well as variations thereof. In some embodiments, a television receiver 110 may be a component that is added into the display device 160, such as in the form of an expansion card. A television receiver 110 and network 120 together with television receivers 110-1, mobile device 127, and/or computer system 128, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc.

In some embodiments, broadcast television programs may be delivered to television receivers, including a television receiver 110, via satellite according to a schedule. On-demand content may also be delivered to a television receiver 110 via satellite. Satellites 106 may be configured to receive uplink signals 122 from satellite uplink 104. In this example, uplink signals 122 may contain one or more transponder streams of particular data or content, such as particular television channels, each of which may be supplied by television service provider 102. For example, each of uplink signals 122 may contain various media content such as HD (High Definition) television channels, SD (Standard Definition) television channels, on-demand programming, programming information (e.g., table data), and/or any other content in the form of at least one transponder stream, and in accordance with an allotted carrier frequency and bandwidth. In this example, different media content may be carried using different satellites of satellites 106. Further, different media content may be carried using different transponders of a particular satellite (e.g., satellite 106-1); thus, such media content may be transmitted at different frequencies and/or different frequency ranges. For example, a first and second television channel may be carried on a first carrier frequency over a first transponder (as part of a single transponder stream) of satellite 106-1, and a third, fourth, and fifth television channel may be carried on a second carrier frequency (as part of another transponder stream) over a transponder of satellite 106-3, or, the third, fourth, and fifth television channel may be carried on a second carrier frequency over a second transponder of satellite 106-1, etc.

The satellites 106 may be further configured to relay uplink signals 122 to the satellite receiver 108 as downlink signals 124. Similar to the uplink signals 122, each of the downlink signals 124 may contain one or more transponder streams of particular data or content, such as various encoded and/or at least partially scrambled television channels, on-demand programming, etc., in accordance with an allotted carrier frequency and bandwidth. The satellite receiver 108, which may include a satellite dish, a low noise block (LNB), and/or other components, may be provided for use to receive television channels, such as on a subscription basis, distributed by the television service provider 102 via the satellites 106. For example, the satellite receiver 108 may be configured to receive particular transponder streams as downlink signals 124, from one or more of the satellites 106. Based at least in part on the characteristics of a given television receiver 110 and/or satellite receiver 108, it may only be possible to capture transponder streams from a limited number of transponders of the satellites 106 concurrently. For example, a tuner of the television receiver 110 may only be able to tune to a single transponder stream from a transponder of a single satellite, such as the satellite 106-1, at a time.

The television receiver 110, which may be communicatively coupled to the satellite receiver 108, may subsequently select, via a tuner, decode, and relay television programming to a television for display thereon. Broadcast television programming or content may be presented "live," or from a recording as previously stored on, by, or at the television receiver 110. For example, an HD channel may be output to a television by the television receiver 110 in accordance with the HDMI/HDCP content protection technologies. Other embodiments are possible. For example, in some embodiments, an HD channel may be output to a television in accordance with the MoCA® (Multimedia over Coax Alliance) home entertainment networking standard. Other embodiments are possible.

The television receiver 110 may select via tuner, decode, and relay particular transponder streams to one or more of television receivers 110-1, which may in turn relay particular transponder streams to display devices 160. For example, the satellite receiver 108 and the television receiver 110 may, respectively, be configured to receive, decode, and relay at least one television channel to a television by way of a television receiver 110-1. Similar to the above example, a television channel may generally be presented "live," or from a recording as previously stored by the television receiver 110, and may be output to the display device 160 by way of the television receiver 110-1 in accordance with a particular content protection technology and/or networking standard. Other embodiments are possible.

In various embodiments, the content resources 126 may be used to provide the television receiver 110 with content (e.g., television programming). The content resources 126 may be used to retrieve television programs or portions of television programs following and/or during a live broadcast of the television programs. The content resources 126 may include the television service provider 102, the service providers 122, the online content sources 112, the catch-up services 114, the subscription services 116, and the television receivers 110-1. Other forms of content resources are further detailed below.

The television service provider 102, which may distribute broadcast television programming to the television receivers 110 via a satellite-based television programming distribution arrangement (or some other form of television programming distribution arrangement, such as a cable-based network or IP-based network, may use an alternate communication path, such as via the network 120, to provide television programming to the television receivers 110. The television receivers 110 may be permitted to request various television programs or portions of television programs from the television service provider 102 via the network 120. For instance, the television service provider 102 may be permitted to transmit a portion of a television program or an entire television program during and/or after a time at which the television program was broadcast live by the television service provider via a satellite-based television programming distribution arrangement.

In some embodiments, the television service provider 102 may provide a television program via on-demand content. On-demand content may be included in a user's subscription or may be provided on a per-request basis. Such on-demand content may be provided via the satellite-based distribution arrangement and/or via the network 120. If the on-demand version of the television program requires payment of a fee, before providing the television program to the television receiver 110, a user of the television receiver 110 may at least need to agree to payment of the fee. On-demand content provided via the satellite-based distribution arrangement may be stored locally by the television receiver 110 to allow on-demand access. On-demand content may also be retrieved via the network 120 from the television service provider 102.

The computing devices 116a-d represent various computerized devices that may be associated with a user of the television receiver 110 and that may be configured to facilate various content discovery features disclosed in various embodiments herein. As indicated by 116a, the computing devices 116a-d may include a laptop computer, a desktop computer, a home server, or another similar form of computerized device. As indicated by 116b and 116c, the computing devices 116a-d may include a cellular phone and/or smartphone, a tablet computer, or another similar form of mobile device. As indicated by 116d, the computing devices 116a-d may include smart glasses or another similar form of wearable computing device.

The television receiver 110 may be provided with access credentials that allow access to content stored and/or accessible through one or more of the computing devices 116a-d. It should be understood that computing devices 116a-d are exemplary in nature. Content may be accessible through a fewer or greater number of computerized devices associated with a user of the television receiver 110.

In some embodiments, the online content sources 112 may represent content resources through which television programs may be retrieved by the television receiver 110 via the network 120. Television programming available through the online content sources 112 may be available for free and not require subscription (a username and/or password may or may not be necessary). Each of the online content sources 112 may represent different websites available via the Internet. For example, some television programming may be legally made available for free (such as television programming provided by government-funded sources, e.g., the BBC or Hulu®). Periodically, the television receiver 110 may poll online content sources 112 to determine which television programs are available and/or which television programs are scheduled to be available in the future. In some embodiments, the television receiver 110 may poll online content sources 112 regarding the availability of at least a portion of a specific television program.

Additionally or alternatively, the online content sources 112 may represent content resources through which other types of content may be retrieved by the computing devices 116 and/or the television receiver 110 via the network 120. For example, content from the online content sources 112 may be pulled by a computing device 116 and/or the television receiver 110. The pulled content may correspond to contextual content pertinent to actors recognized in programming content captured by the computer devices 106. Such online content sources 112 may include Internet Movie Database (IMDb), Wikipedia, other websites, and/or the like. As another example, the pulled content may correspond to contextual content pertinent to objects (e.g., products) recognized in programming content captured by the computer devices 106. Such online content sources 112 may include online retailers, manufacturer websites, other websites, and/or the like.

The catch-up services 114 may represent content resources through which television programs may be retrieved by the television receiver 110 via the network 120. Television programming available through public sources may be available for free and not require subscription (a username and/or password may or may not be necessary). Some catch-up services may require a subscription and may require user authentication. The catch-up services 114 may only make a television program available during the live broadcast of the television program. For example, a catch-up service authorized or run by a television channel (e.g., NBC) or television program production company may make at least a portion of a television program available for streaming or download during a live broadcast scheduled time slot. Therefore, a user may be permitted to watch a missed portion of a live broadcast television program via a catch-up service but may not be permitted to view the entire television program via the catch-up service at a later time. In some embodiments, television programs may be available via a catch-up service for up to a fixed period of time after the live broadcast of the television program or indefinitely (e.g., until the catch-up service provider decides to remove accessibility to the television program). Periodically, the television receiver 110 may poll the catch-up services 114 to determine which television programs are available and/or which television programs are scheduled to be available in the future. In some embodiments, the television receiver 110 may poll the catch-up services 114 regarding the availability of at least a portion of a specific television program.

The subscription services 116 may represent content resources through which television programs may be retrieved by the television receivers 110 via the network 120. Television programming available through subscription services 116 may require a paid subscription and may require a username and/or password be provided. Each of subscription services 116 may represent different websites available via the Internet. For example, some television programming may be legally made available via a service operated by a television channel or authorized agent of the television channel or television program production company. Periodically, a television receiver 110 may poll subscription services 116 to determine which television programs are available and/or which television programs are scheduled to be available in the future. In some embodiments, the television receiver 110 may poll the subscription services 116 regarding the availability of at least a portion of a specific television program.

The television receiver 110 may be able to retrieve at least a portion of a television program through other television receivers 110-1, which can function as content resources. Similarly, the television receiver 110 may be able to cast at least a portion of a television program through other television receivers and/or to computing devices 116. For instance, a Slingbox® (or other form of media streaming device) functioning in concert with a television receiver may permit television programs to be captured and streamed over the network 120. In some embodiments, the television receivers 110 may have such media streaming capabilities integrated. In some embodiments, the television receivers 110 may cast programming content to the computing devices 116 via wireless signals. For example, the programming content from the television receiver may be indirectly transmitted via a local network (e.g., via Wi-Fi) or directly transmitted to the computing device via a casting device integrated with the television receiver 110 or coupled to the television receiver 110 (e.g., via a dongle). In some embodiments, the programming content may be cast to the computing device via a wired connection (e.g., via one or more of HDMI, USB, lightning connector, etc.). Some embodiments of the television receivers 100 may provide for simulcasting such that the same programming that is being displayed on the display device 160 is being displayed on one or more of the computing devices 116 simultaneously or substantially simultaneously.

A user may be able to obtain at least a portion of a television program via the television receivers 110, which may be associated with other users or with the same user. For instance, the user may have multiple television receivers at different locations. Periodically, the television receiver 110 may poll the other television receivers 110 to determine which television programs are available and/or which television programs are scheduled to be available in the future. In some embodiments, the television receiver 110 may poll the television receivers 110-1 regarding the availability of at least a portion of a specific television program.

While network configuration data may be broadcast repeatedly via satellite to television receivers, it should be understood that a similar arrangement may be used in cable-based television programming broadcast networks to broadcast network configuration. For either type of network, various other forms of data may be transmitted via an Internet-based network 120 connection rather than using the television service provider's proprietary network. For instance, EPG data may be transmitted to television receivers via the network 120 (e.g., Internet) connection. As another example, firmware and/or software updates may be transmitted on demand to a television receiver via the Internet rather than the television receiver receiving the update via the television programming broadcast network.

Figure 2:
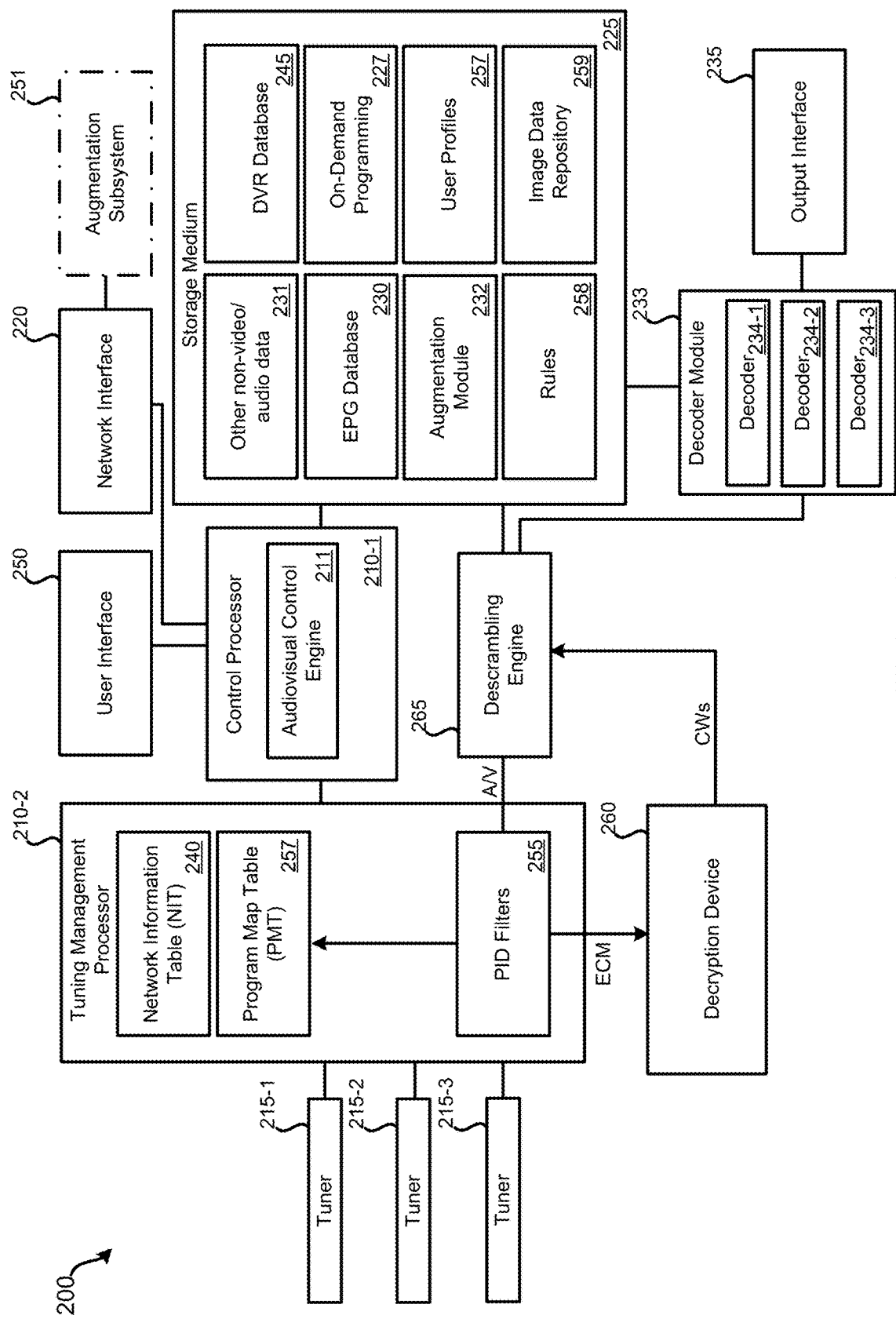
FIG. 2 illustrates a receiver that makes use of and/or interacts with a content augmentation system, in accordance with certain embodiments of the present disclosure.

FIG. 2 illustrates a receiver 200 that makes use of and/or interacts with a content augmentation system, in accordance with certain embodiments of the present disclosure. Certain embodiments of the receiver 200 may include set top boxes (STBs), television receivers, and over-the-top receivers. In some embodiments, the receiver 200 may correspond to the television receiver 110. In various embodiments, in addition to being in the form of a STB, a receiver may be incorporated as part of another device, such as a television or other form of display device, such as a computer, smartphone, tablet, or other handheld portable electronic device. For example, a television may have an integrated receiver (which does not involve an external STB being coupled with the television).

The receiver 200 may represent receiver 110 of FIG. 1 and may be in the form of a STB that communicates with a display device such as a television. The receiver 200 may be incorporated as part of a television, such as the display device 160 of FIG. 1 or television 200 of FIG. 2, etc. The receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, networking information table (NIT) 240, digital video recorder (DVR) database 245 (which may include provider-managed television programming storage and/or user-defined television programming), on-demand programming 227, accessibility module 232, commercial database 246, user interface 250, decryption device 260, decoder module 233, interface 235, and/or descrambling engine 265. In other embodiments of receiver 200, fewer or greater numbers of components may be present. It should be understood that the various components of receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID filters 255 may be handled by separate hardware from program map table 257. The receiver 200 may be in data communication with accessibility system 251, such as by way of network interface 220.

The processors 210 may include those configured to perform processes such as tuning to a particular channel, accessing and displaying EPG information from the EPG database 230, and/or receiving and processing input from a user. For example, the processors 210 may include one or more processors dedicated to decoding video signals from a particular format, such as MPEG, for output and display on a television and for performing decryption, if required. It should be understood that the functions performed by various modules of FIG. 2 may be performed using one or more processors. As such, for example, functions of the descrambling engine 265 may be performed by the control processor 210-1.

The control processor 210-1 may communicate with tuning management processor 210-2. The control processor 210-1 may control the recording of television channels based at least in part on timers stored in the DVR database 245. The control processor 210-1 may also provide commands to the tuning management processor 210-2 when recording of a television channel is to cease. In addition to providing commands relating to the recording of television channels, the control processor 210-1 may provide commands to the tuning management processor 210-2 that indicate television channels to be output to the decoder module 233 for output to a display device. The control processor 210-1 may also communicate with the network interface 220 and the user interface 250. The control processor 210-1 may handle incoming data from network interface 220, including network transport streams received from over-the-top service providers. The control processor 210-1 may handle incoming data from the network interface 220, including network transport streams received from the user interface 250, which may include user input received by way of one or more human interface devices. Additionally, the control processor 210-1 may be configured to output data via the network interface 220. The control processor 210 may also be configured to perform image and audio analysis, such as to identify contextual aspects present in an audio or video stream, for example facial recognition or voice recognition.

The tuners 215 may include one or more tuners used to tune to transponders that include broadcasts of one or more television channels that may be received from a satellite or cable system, for example. In the illustrated embodiment of receiver 200, three tuners are present (tuner 215-1, tuner 215-2, and tuner 215-3). In other embodiments, two or more than three tuners may be present, such as four, six, or eight tuners. Each tuner contained in the tuners 215 may be capable of receiving and processing a single transponder stream from a satellite transponder at a given time, for example. As such, a single tuner may tune to a single transponder stream at a given time. If the tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of the tuners 215 may be used to receive the signal containing the multiple television channels for presentation and/or recording. The tuners 215 may receive commands from the tuning management processor 210-2. Such commands may instruct the tuners 215 which frequencies are to be used for tuning.

The network interface 220 may be used to communicate via an alternate communication channel with a television service provider, if such communication channel is available. The primary communication channel may be via satellite (which may be unidirectional to the receiver 200) and the alternate communication channel (which may be bidirectional) may be via a network, such as the Internet. Referring back to FIG. 1, receiver 110 may be able to communicate with television service provider system 102 via a network 120, such as the Internet. This communication may be bidirectional: data may be transmitted from the receiver 110 to the television service provider system 102 and from the television service provider system 102 to the receiver 110. Referring back to FIG. 2, the network interface 220 may be configured to communicate via one or more networks, such as the Internet, to communicate with television service provider system 102 of FIG. 1.

Other information may be transmitted and/or received via the network interface 220. For example, commands, data, etc. may be transmitted to and/or received from the augmentation subsystem 251, such as data representing interface elements to be displayed or output by the augmentation subsystem 251 and/or the receiver 200 and the display 160. For example, augmented context interface elements or data corresponding to the interface elements may be transmitted to the augmentation subsystem 251 by way of the network interface 220 for display or output by the augmentation subsystem 251.

The storage medium 225 may represent one or more non-transitory computer-readable storage mediums. The storage medium 225 may include memory and/or a hard drive. The storage medium 225 may be used to store information received from one or more satellites and/or information received via the network interface 220. The storage medium 225 may store information related to the EPG database 230, augmentation module 232 and related preferences, other non-video/audio data 231, DVR database 245, commercial database 246, and/or on-demand programming 227. Recorded television programs may be stored using the storage medium 225 as part of the DVR database 245. The storage medium 225 may be partitioned or otherwise divided (such as into folders) such that predefined amounts of the storage medium 225 are devoted to storage of television programs recorded due to user-defined timers and stored television programs recorded due to provider-defined timers.

The EPG database 230 may store information related to television channels and the timing of programs appearing on such television channels. The EPG database 230 may be stored using the storage medium 225, which may be a hard drive. Information from the EPG database 230 may be used to inform users of what television channels or programs are popular and/or provide recommendations to the user. Information from the EPG database 230 may provide the user with a visual interface displayed by a television that allows a user to browse and select television channels and/or television programs for viewing and/or recording. Information used to populate the EPG database 230 may be received via the network interface 220 and/or via satellites, such as the satellite 106 of FIG. 1 via the tuners 215. For instance, updates to the EPG database 230 may be received periodically via satellite. The EPG database 230 may serve as an interface for a user to control DVR functions of the receiver 200, and/or to enable viewing and/or recording of multiple television channels simultaneously. Information from EPG database 230 may be output as a video stream to a display device. A particular user may issue commands indicating that an EPG interface be presented. A user issuing a command that an EPG be displayed may constitute a change command.

The augmentation module 232 may implement various functionality into the receiver 200 related to the augmentation subsystem 251. For example, the augmentation module 232 may allow for augmentation of an electronic program guide according to system-generated recommendations of content, as disclose herein. In some embodiments, the augmentation module 232 may perform contextual analysis and obtain contextual data for display or output by the augmentation subsystem 251, such as to obtain data regarding persons identified in video and prepare the data for transmission to and output by the augmentation subsystem 251. As an example, the augmentation module 232 may identify a number of persons displayed on screen, objects displayed on screen, text displayed on screen, etc., and provide this information to the augmentation subsystem 251 for output. Additionally, in some embodiments, the augmentation module 232 may identify interface elements included in a user interface generated by the receiver 200 and transmit data relating to the interface elements to the augmentation subsystem 251 for output. For example, the augmentation module 232 may directly generate accessible interface elements for transmission to the augmentation subsystem 251. In some embodiments, the augmentation module 232 may simply transmit data to be included in the interface element so that the augmentation subsystem 251 may process and generate an interface element for output. The augmentation module 232 may further control and store user preferences relating to augmentation features and the augmentation subsystem 251, e.g., in the user profiles 257.

In some embodiments, the control processor 210-1 may include an audiovisual control engine 211 that may manage augmentations, which may be video augmentations, EPG augmentations, and/or the like based at least in part on user selections made via the augmented context interface, user profile information 257, and/or the rules 258. The audiovisual control engine 211 may cause output via television interface 235 that facilitates augmentations for particular viewers and viewer selections.

Some embodiments could employ facial and/or object recognition as part of the audiovisual control engine 211. In some embodiments, the image handling features of the audiovisual control engine 211 may perform correlation of images captured with the augmentation subsystem 251 to reference images, which may be available from a remote source and/or which may be stored in a image data repository 259. The image data could include any suitable facial or object trait qualifications for specific individuals or objects in any suitable form for correlation. It will be appreciated that a variety of sources for the facial information may exist, such as a network or Internet source such as a local database contained within the accessibility system that may be optionally updated periodically or aperiodically. In some embodiments, image and/or facial recognition algorithms performed by the augmentation system 251 Optionally, images of faces may be transmitted to an external network service provider, such as a facial recognition provider to identify an identity of faces contained in the images.

The network information table (NIT) 240 may store information used by the receiver 200 to access various television channels. The NIT 240 may be stored locally by a processor, such as the tuning management processor 210-2 and/or by the storage medium 225. Information used to populate the NIT 240 may be received via satellite (or cable) through the tuners 215, may be received via the network interface 220, such as from the television service provider. As such, information present in the NIT 240 may be periodically updated. In some embodiments, NIT 240 may be locally-stored by the receiver 200 using the storage medium 225. Generally, the NIT 240 may store information about a service provider network, such as a satellite-based service provider network. Information that may be present in the NIT 240 may include: television channel numbers, satellite identifiers (which may be used to ensure different satellites are tuned to for reception of desired television channels), frequency identifiers, transponder identifiers for various television channels, antenna identifiers (which may be used to ensure different antennas are tuned to for reception of desired television channels), radio frequency identifiers, and/or subchannel identifiers for various television channels. In some embodiments, the NIT 240 may contain additional data or additional tables may be stored by the receiver. For example, while specific audio PIDs and video PIDs may not be present in the NIT 240, a channel identifier may be present within the NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the receiver in a similar manner to the NIT. For example, a PMT may store information on audio PIDs, and/or video PIDs. A PMT stores data on ECM (entitlement control message) PIDs for television channels that are transmitted on a transponder stream, transport stream, or digital broadcast. If, for a first television channel, multiple television channels are to be tuned to, the NIT 240 and/or the PMT 257 may indicate a second television channel that is to be tuned to when a first channel is tuned to; this may allow for switching to output of the second television channel for different commercials, for example.

A table, such as the NIT, PAT, or PMT may store indications of PIDs that are related to supplemental audio content for individual channels or other forms of content. For instance, each television channel may be associated with a different supplemental audio PID. If supplemental audio content is to be transmitted for a given television channel, packets containing the supplemental audio are transmitted to the receiver having its associated supplemental audio content PID. This PID could be distinct from any of the audio programs of the television programming (e.g., the first audio program, second audio program (SAP), actual descriptive audio). In some embodiments, supplemental audio content is transmitted using the same transponder stream as the television channel or content to which the supplemental audio content corresponds. In some embodiments, a single supplemental audio PID is used to identify supplemental audio for multiple television channels, such as all the television channels on a given transponder. A second identifier present within the supplemental audio data may be used to distinguish for which television channel the supplemental audio data corresponds.

Based at least in part on information in the NIT, it may be possible to determine the proper satellite and transponder to which to tune for a particular television channel, or to determine the proper antenna and frequency to which to tune to for a particular television channel. In some embodiments, the NIT may list a particular frequency to which to tune for a particular television channel. Once tuned to the proper satellite/transponder/antenna/frequency, the PMT PID may be used to retrieve a program map table that indicates the PIDs for audio and video streams of television channels transmitted by that transponder.

While a large portion of storage space of the storage medium 225 may be devoted to storage of television programming, a portion may be devoted to storage of non-audio/video data, such as the EPG database 230 and other non-video/audio data 231. This "other" data may permit the receiver 200 to function properly. In some embodiments, at least ten gigabytes are allocated to such other data. For example, if the NIT 240 is stored by the storage medium 225, it may be part of the other non-video/audio data 231.

The decoder module 233 may serve to convert encoded video and audio into a format suitable for output to a display device. For instance, the decoder module 233 may receive MPEG video and audio from the storage medium 225, the network interface 220, or the descrambling engine 265 to be output to a television. MPEG video and audio from the storage medium 225 may have been recorded to the DVR database 245 as part of a previously-recorded television program. The decoder module 233 may convert the MPEG video and audio into a format appropriate to be displayed by a television or other form of display device and audio into a format appropriate to be output from speakers, respectively. The decoder module 233 may have the ability to convert a finite number of television channel streams received from the storage medium 225, the network interface 220, or the descrambling engine 265 simultaneously. For instance, each of the decoders 234 within the decoder module 233 may be able to only decode a single television channel at a time.

While a television channel is being decoded by a decoder of the decoders 234, the television channel is not necessarily output to a display device via the television interface 235. For instance, a television channel may be decoded but not output to allow for seamless or near-seamless switching to the television channel when output is desired. For example, if a second television channel is to be output for presentation during commercial breaks on a first television channel, the second television channel and the first television channel may each be continuously decoded by different decoders of the decoder module 233 to allow for fast switching between the channels. Without a television channel being continuously decoded, fast switching may be difficult due at least in part to the format in which the channel is encoded. For instance, for MPEG encoding, it may be necessary to first decode an I-frame before certain subsequent (or earlier) received frames may be properly decoded. The output of the decoder, which is provided to the television interface 235, may be controlled by the control processor 210-1, or some other processor. While the decoder module 233 is illustrated as having three decoders 234 (decoder 234-1, decoder 234-2, and decoder 234-3), in other embodiments, a greater or fewer number of decoders may be present in the receiver 200.

The television interface 235 may serve to output a signal to a television (or another form of display device) in a proper format for display of video and playback of audio. As such, the television interface 235 may output one or more television channels, stored television programming from the storage medium 225 (e.g., television programs from the DVR database 245, television programs from on-demand programming 227 and/or information from the EPG database 230) to a television for presentation.

Digital Video Recorder (DVR) functionality may permit a television channel to be recorded for a period of time. DVR functionality of the receiver 200 may be managed by the control processor 210-1. The control processor 210-1 may coordinate the television channel, start time, and stop time of when recording of a television channel is to occur. The DVR database 245 may store information related to the recording of television channels. The DVR database 245 may store timers that are used by the control processor 210-1 to determine when a television channel should be tuned to and its programs recorded to the DVR database 245 of storage medium 225. In some embodiments, a limited amount of the storage medium 225 may be devoted to the DVR database 245. Timers may be set by the television service provider and/or one or more users of the receiver 200.

The DVR database 245 may also be used to record recordings of service provider-defined television channels. For each day, an array of files may be created. For example, based at least in part on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to the receiver 200 via the television provider's network. For example, referring to the satellite television distribution system 100 of FIG. 1, in a satellite-based television service provider system, data necessary to create the provider-defined timers at the receiver 110 may be received via satellite. It will be appreciated that accessibility systems described herein may be configured to receive and or identify provider-defined timers as interface elements, such as interface elements having a particular focus, and may generate accessible interface elements corresponding to accessible alternative versions of the provider-defined timers.

As an example of DVR functionality of the receiver 200 being used to record based at least in part on provider-defined timers, a television service provider may configure the receiver 200 to record television programming on multiple, predefined television channels for a predefined period of time, on predefined dates. For instance, a television service provider may configure the receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based at least in part on provider-defined timers may be stored to a portion of the storage medium 225 for provider-managed television programming storage.

User profiles 257 may include stored user preferences that may be explicitly configured by users or inferred by the television receiver 200 based at least in part on selections made with respect to augmented content in accordance with certain embodiments disclosed herein. The user profiles 257 may include profiles for multiple users or may include a single profile for the television receiver in general. In some embodiments, a user is permitted to select which user profile of the user profiles 257 is active. For instance, a user can log on to television receiver 200. In some embodiments, the user profiles 257 may include preferences for customized content presentation adjustments disclosed herein. The preferences could include customized viewing interests, such as programming content, advertising content, product content, and/or the like that corresponds to augmented content selections relating to recognized actors and/or products. The user profiles 257 may further include user feedback received from the user regarding customizations. The feedback data may be used to refine the customizations for particular viewers and types of content customizations.

In some embodiments, rules 258 may include one or more rules for matching a set of one or more facial or object features to a set of one or more augmentation adjustments, as disclosed further herein. In some embodiments, the rules 258 may include criteria for matching a set of indicia of viewer interest to a set of one or more categories. In some embodiments, the rules 258 may include criteria for matching a set of one or more categories to a set of one or more augmentation customizations.

The on-demand programming 227 may represent additional television programming stored by the storage medium 225. The on-demand programming 227 may include television programming that was not recorded to the storage medium 225 via a timer (either user- or provider-defined). Rather, on-demand programming is programming provided to the receiver directly for storage by the receiver and for later presentation to one or more users. The on-demand programming 227 may not be user-selected. As such, the television programming stored to the on-demand programming storage 227 may be the same for each receiver of a television service provider.

The user interface 250 may include a remote control (physically separate from the receiver 200) and/or one or more buttons on the receiver 200 that allow a user to interact with the receiver 200. The user interface 250 may be used to select a television channel for viewing, view information from the EPG database 230, and/or program a timer stored to DVR database 245, wherein the timer is used to control the DVR functionality of the control processor 210-1. The user interface 250 may also be used to transmit commands to the receiver 200.

Referring back to the tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of the tuners 215 is receiving data from a particular transponder of a satellite, the transponder stream may be a series of data packets corresponding to multiple television channels. Each data packet may contain a packet identifier (PID), which, in combination with the NIT 240 and/or the PMT 257, may be determined to be associated with a particular television channel. Particular data packets, referred to as entitlement control messages (ECMs), may be periodically transmitted. ECMs may be associated with another PID and may be encrypted; the receiver 200 may use the decryption device 260 to decrypt ECMs. Decryption of an ECM may only be possible if the user has authorization to access the particular television channel associated with the ECM. When an ECM is determined to correspond to a television channel being stored and/or displayed, the ECM may be provided to the decryption device 260 for decryption.

The decryption device 260 may be a removable or non-removable smart card. When the decryption device 260 receives an encrypted ECM, the decryption device 260 may decrypt the ECM to obtain some number of control words. In some embodiments, from each ECM received by the decryption device 260, two control words are obtained. In some embodiments, when the decryption device 260 receives an ECM, it compares the ECM to the previously received ECM. If the two ECMs match, the second ECM is not decrypted because the same control words would be obtained. In other embodiments, each ECM received by the decryption device 260 is decrypted; however, if a second ECM matches a first ECM, the outputted control words will match; thus, effectively, the second ECM does not affect the control words output by the decryption device 260. The decryption device 260 may be permanently part of the receiver 200 or may be configured to be inserted and removed from the receiver 200. In some embodiments, the control processor 210-1, the tuning management processor 210-2, or other hardware may be able to determine that a received ECM has not changed from the previous iteration, and therefore not provide the repeated ECM to the smart card, since the same control word(s) will be obtained.

The tuning management processor 210-2 may be in communication with the tuners 215 and the control processor 210-1. The tuning management processor 210-2 may be configured to receive commands from the control processor 210-1. Such commands may indicate when to start/stop recording a television channel and/or when to start/stop causing a television channel to be output to a television. The tuning management processor 210-2 may control the tuners 215. From the tuners 215, the tuning management processor 210-2 may receive transponder streams of packetized data. From the network interface 220, the tuning management processor 210-2 may receive network transport stream of packetized data. As previously detailed, some or all of these packets may include a PID that identifies the content of the packet.

The tuning management processor 210-2 may be configured to create one or more PID filters 255 that sort packets received from the tuners 215 and/or the network interface 220 based at least in part on the PIDs. When a tuner is initially tuned to a particular frequency (e.g., to a particular transponder of a satellite), a PID filter may be created based at least in part on the PMT data. The PID created, based at least in part on the PMT data packets, may be known because it is stored as part of the NIT 240 or another table, such as a program association table (PAT). From the PMT data packets, PMT may be constructed by the tuning management processor 210-2.

The PID filters 255 may be configured to filter data packets based at least in part on PIDs. In some embodiments, the PID filters 255 are created and executed by the tuning management processor 210-2. For each television channel to be output for presentation or recorded, a separate PID filter may be configured. In other embodiments, separate hardware may be used to create and execute such PID filters. Depending on a television channel selected for recording/viewing, a PID filter may be created to filter: (1) the video packets associated with the television channel; (2) the audio packets associated with the television channel; and (3), if enabled, supplemental audio content for use in conjunction with interactive content. The PMT 257 may store the particular assignments of PIDs for individual television channels. For example, if a transponder data stream includes multiple television channels, data packets corresponding to a television channel that is not desired to be stored or displayed by the user may be ignored by the PID filters 255 and not routed to the descrambling engine 265, the decryption device 260, or the control processor 210-1. As such, only data packets corresponding to the one or more television channels desired to be stored and/or displayed may be filtered and passed to either the descrambling engine 265 or the decryption device 260; other data packets may be ignored. For each television channel, a stream of video packets, a stream of audio packets (one or both of the audio programs), a stream of supplemental audio content, and/or a stream of ECM packets may be present, each stream identified by a PID. In some embodiments, a common ECM stream may be used for multiple television channels. Additional data packets corresponding to other information, such as updates to the NIT 240, may be appropriately routed by the PID filters 255. At a given time, one or multiple PID filters may be executed by the tuning management processor 210-2.

The descrambling engine 265 may use the control words output by the decryption device 260 in order to descramble video and/or audio corresponding to television channels for storage and/or presentation. Video and/or audio data contained in the transponder data stream received by the tuners 215 may be scrambled. Video and/or audio data may be descrambled by the descrambling engine 265 using a particular control word. Which control word output by the decryption device 260 to be used for successful descrambling may be indicated by a scramble control identifier present within the data packet containing the scrambled video or audio. Descrambled video and/or audio may be output by the descrambling engine 265 to the storage medium 225 for storage (in the DVR database 245) and/or to the decoder module 233 for output to a television or other presentation equipment via the television interface 235.

For simplicity, the receiver 200 of FIG. 2 has been reduced to a block diagram; commonly known parts, such as a power supply, have been omitted. Further, some routing between the various modules of the receiver 200 has been illustrated. Such illustrations are for exemplary purposes only. The state of two modules not being directly or indirectly connected does not indicate the modules cannot communicate. Rather, connections between modules of the receiver 200 are intended only to indicate possible common data routing. It should be understood that the modules of the receiver 200 may be combined into a fewer number of modules or divided into a greater number of modules.

Further, the components of the television receiver 200 may be part of another device, such as built into a television. The television receiver 200 may include one or more instances of various computerized components, such as disclosed in relation to computer systems disclosed further herein. While the television receiver 200 has been illustrated as a satellite receiver, it is to be appreciated that techniques below may be implemented in other types of television receiving devices, such as cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations.

Figure 3A:
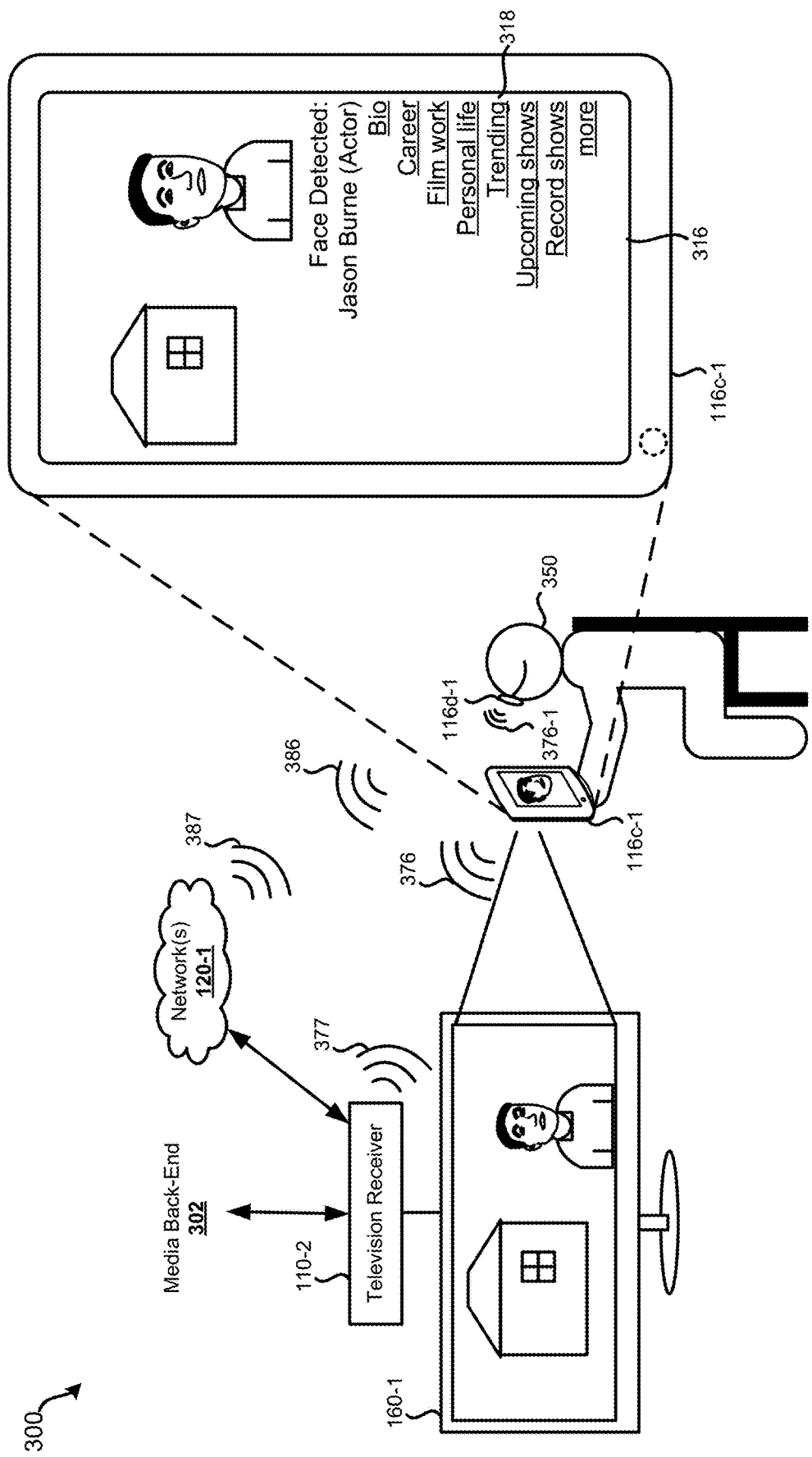
FIGS. 3A and 3B are simplified illustrations of an augmented content subsystem, in accordance with certain embodiments of the present disclosure.
Figure 3B:
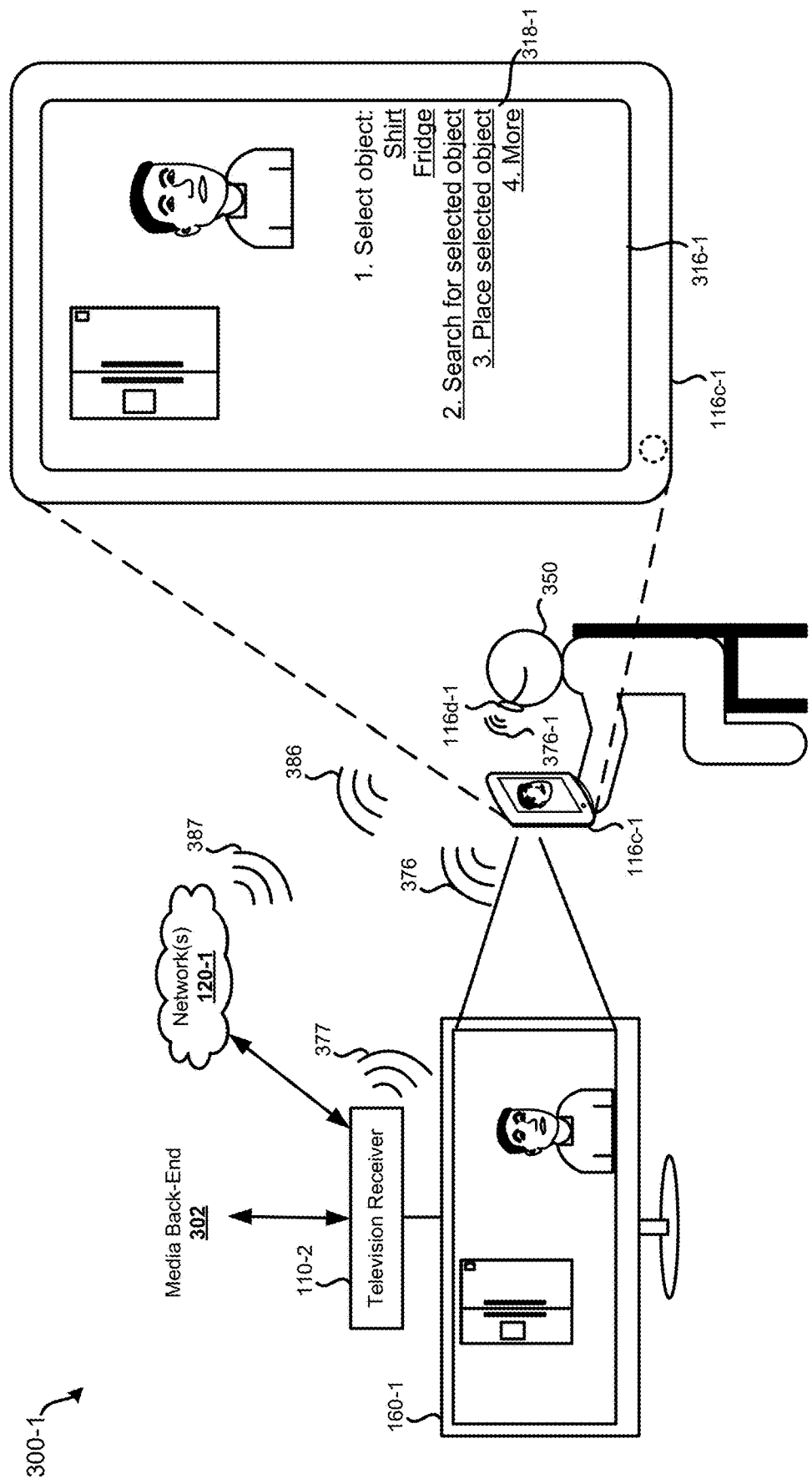

FIGS. 3A and 3B are simplified illustrations of an augmented content subsystem 300, in accordance with certain embodiments of the present disclosure. The augmented content subsystem 300 may include the television receiver 110-2. The augmented content subsystem 300 may include a display device 160-1 communicatively coupled with the television receiver 110-2. The television receiver 110-2 may be communicatively coupled with a media service back-end 302, which may correspond to certain upstream elements of FIG. 1 and may include the network 120-1.

The augmented content subsystem 300 may include any one or combination of computing devices 116a-d. Depicted are two examples of a computing device 116c and a computing device 116d. Though both examples are depicted, a user 350 may only use one computing device 116 in certain use cases. A number of other examples are possible but not shown.

In some embodiments, the display 160 and/or the television receiver 110 may be controlled by the user 550 using the computing device 116 to send wireless signals 376 to communicate with the television receiver device 110 and/or the display 160. The computing device 116 may receive wireless signals 277 from the television receiver device 110 to effectuate bi-directional communication. The computing device 116 may further receive and send wireless signals 386, 387 from the network 120 through various means such as a Wi-Fi router, modem, cellular access points, and/or the like.

As disclosed with respect to various embodiments herein, the augmented content subsystem 300 may facilitate analysis of the video obtained by the computing device(s) 116 to identify one or more contextual elements. For example, the video may be analyzed using facial recognition, object recognition, shape recognition, textual recognition, and/or the like to identify contextual elements. As an example, the video received by the computing device 116 may be analyzed to identify actors and/or characters depicted in the video. Alternatively or additionally, the video may be analyzed to determine objects in the video (e.g., products, locations depicted, etc.). Based at least in part on the facial and/or object recognition from the video, the television receiver 110 and/or the computing device 116 may gather contextual elements pertinent to the individuals and/or objects recognized and may generate user-selectable options pertinent to the individuals recognized (illustrated by FIG. 3A) and/or user-selectable options pertinent to the objects recognized (illustrated by FIG. 3B).

Certain embodiments may utilize the captured image data and gathered content to generate and present augmented reality on the computing device 116 to display the actor and/or object with an augmented reality overlay 316 of content on images currently captured with the camera of the computing device. The user-selectable options 318 presented with the overlay 316 may allow for taking actions pertinent to the recognized actors and/or objects (e.g., to find more movies and shows with that recognized actor, to purchase the recognized product from an online vendor, and/or the like). In certain embodiments, the computing device 116 may communicate with the television receiver 110 to pull information (e.g., electronic programming guide information and/or other schedule information) and generate and present an augmented reality overlay 316 based at least in part on the pulled information.

Certain embodiments may further generate user-selectable options for presentation on the computing device 116 and/or with an electronic programming guide displayed via the display 160 to prompt a user to schedule recordings of discovered programs that are related to the recognized actors and/or objects. In some embodiments, the computing device 116 may communicate with the receiver 110 to customize the electronic programming guide so that upcoming programming content is flagged based at least in part on interests of the user inferred from augmented reality selections. For example, if a user capture images of an actor and makes a selection of user-selectable option pertaining to the recognized actor, an interest in the actor may be inferred by the system as a basis for searching for and flagging upcoming programs involving the actor. With some embodiments, the computing device 116 may communicate with the receiver 110 to automatically create recording settings to record programs based at least in part on the augmented reality and selections made therewith.

In some embodiments, the computing device 116 may use the recognized actors and/or objects and the pulled content to generate augmented reality to facilitate product placement in the home. For example, the computing device 116 may capture an image of a fridge, pull options for fridges from remote online resources, and display contextual interface elements corresponding to the options. In some embodiments, the computing device 116 may aggregate, process, format, crop, rescale, and/or otherwise prepare images of the products for display the product options as overlay on images currently being captured by the computing device 116 (e.g., an image of a fridge as an overlay on images of a kitchen being captured by the camera of the mobile device). In some embodiments, the computing device may use the recognized actors and/or objects and the pulled content to generate augmented reality to facilitate projections of captured images and masks based at least in part on the recognized actors and/or objects. Some embodiments may further provide for the computing device to casts image to the receiver, and the receiver may use the images for overlays with programming content.

Figure 4:
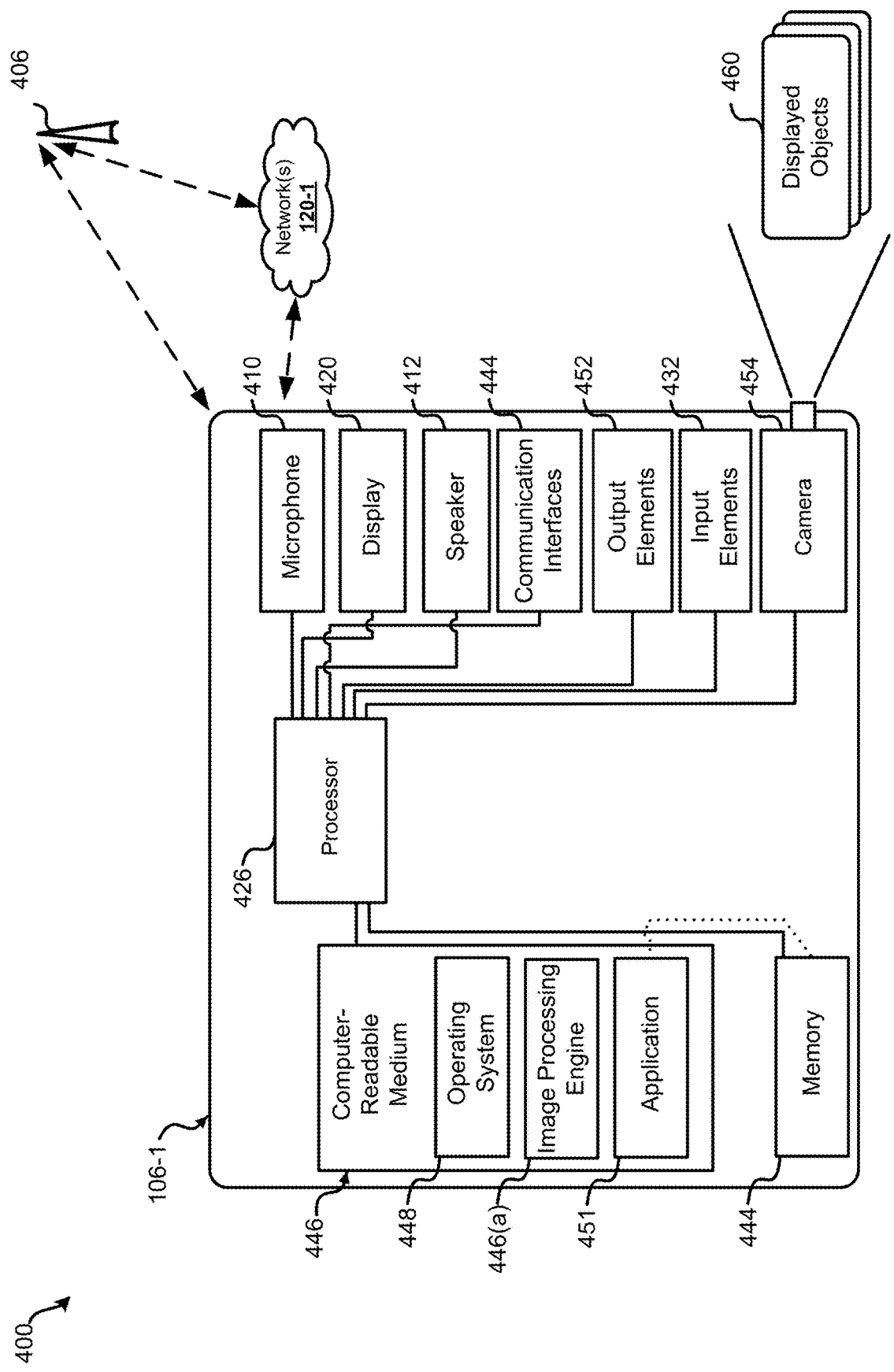
FIG. 4 is a block diagram of a system including one non-limiting example of a computing device configured to facilitate content discovery based at least in part on augmented context, in accordance with certain embodiments of the present disclosure.

FIG. 4 is a block diagram of a system 400 including one non-limiting example of a computing device 116 configured to facilitate content discovery based at least in part on augmented context, in accordance with certain embodiments of the present disclosure. The computing device 116 may be a portable device suitable for sending and receiving information to/from the receiver 110 and over a network to/from remote data sources (e.g., service providers 122 and online content sources 112) in accordance with embodiments described herein. For example, in various embodiments, the computing device 116 may correspond to one or more of computing devices 116c, 116d depicted in FIGS. 1 and 2, and/or other computing devices 116a, 106b depicted in FIG. 1.

In some embodiments, the computing device 116 may be provided with an application 451, which may, in some embodiments, correspond to a mobile application configured to run on the computing device 116 to facilitate various embodiments of this disclosure. For example without limitation, the mobile application 451 may transform the computing device 116 into an augmented reality generator to facilitate features of various embodiments disclosed herein. In various embodiments, the application 451 can be any suitable computer program that can be installed and run on the computing device 116, and, in some embodiments, the application 451 may not be a mobile app but may be another type of application, set of applications, and/or other executable code configured to facilitate embodiments disclosed herein. The application 451 may be provided in any suitable way. For non-limiting example, the application 451 may be made available from a website, an application store, the service provider 102, etc. for download to the computing device 116; alternatively, it may be pre-installed on the computing device 116.

In various embodiments, the computing device 116 configured with the application 451 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. As shown in FIG. 4, the computing device 116 includes a display 420 and input elements 432 to allow a user to input information into the computing device 116. By way of example without limitation, the input elements 432 may include one or more of a keypad, a trackball, a touchscreen, a touchpad, a pointing device, a microphone, a voice recognition device, or any other appropriate mechanism for the user to provide input.

In various embodiments, the computing device 116 may pull content objects of any suitable type from the receiver 110 and/or from online data sources via the network 120 in order to provide the content objects to a user of the computing device 116 through the application 451. The application 451 can include a utility that communicates with the receiver 110 and/or from online data sources via the network 120 to control downloading, displaying, caching, and/or other operations concerning the handling of content objects. The application 451 and the computing device 116 may cooperate with the receiver 110 to facilitate tracking of (and customizations of user profiles and other features disclosed herein based at least in part on) user selections in response to content objects displayed through the one or more additional applications.

The user selection of a user-selectable option corresponding to the application 451 may involve any one or combination of various user inputs. The user selection may be in the form of a keyboard/keypad input, a touch pad input, a track ball input, a mouse input, a voice command, etc. For example, the content object may be selected by the user by pointing and clicking on a content object. As another example, a content object may be selected by an appropriate tap or movement applied to a touch screen or pad of the computing device 116.

The computing device 116 includes a memory 434 communicatively coupled to a processor 436 (e.g., a microprocessor) for processing the functions of the computing device 116. The computing device 116 may include at least one antenna 438 for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The computing device 116 may also include a microphone 440 to allow a user to transmit voice communication through the computing device 116, and a speaker 442 to allow the user to hear voice communication. The antenna 438 may include a cellular antenna (e.g., for sending and receiving cellular voice and data communication, such as through a network such as a 3G or 4G network). In addition, the computing device 116 may include one or more interfaces in addition to the antenna 438, e.g., a wireless interface coupled to an antenna.

The communications interfaces 444 can provide a near field communication interface (e.g., contactless interface, Bluetooth, optical interface, infrared interface, etc.) and/or wireless communications interfaces capable of communicating through a cellular network, such as GSM, or through Wi-Fi, such as with a wireless local area network (WLAN). Accordingly, the computing device 116 may be capable of transmitting and receiving information wirelessly through both short range, radio frequency (RF), cellular, and Wi-Fi connections. The computing device 116 may access the network 108 through a wireless link to an access point. For example, a computing device 116 may access the network 108 through one or more access points 406. The access points 406 may be of any suitable type or types. For example, an access point 406 may be a cellular base station, an access point for wireless local area network (e.g., a Wi-Fi access point), an access point for wireless personal area network (e.g., a Bluetooth access point), etc. The access point 406 may connect the computing device 116 to the network 108, which may include the Internet, an intranet, a local area network, private communication networks, etc. In some embodiments, the communications interfaces 444 may allow computing device 116 to receive programming content cast from the television receiver. For example, the programming content from the television receiver may be indirectly transmitted via a local network (e.g., via Wi-Fi) or directly transmitted to the computing device via a casting device integrated with the television receiver or coupled to the television receiver (e.g., via a dongle). As another example, the television receiver may cast programming content to the computing device via a wired connection (e.g., via one or more of HDMI, USB, lightning connector, etc.). Some embodiments may provide for simulcasting such that the same programming that is being displayed on the display device is being displayed on the computing device 116 simultaneously or substantially simultaneously.

The computing device 116 can also include at least one computer-readable medium 446 coupled to the processor 436, which stores application programs and other computer code instructions for operating the device, such as an operating system (OS) 448. In some embodiments, the application 451 may be stored in the memory 434 and/or computer-readable media 446. Again, the example of computing device 116 is non-limiting. Other devices, such as those disclosed herein, may be used.

The mobile computing device 436 can additionally include an integrated camera 454, capable of capturing images and/or video, and output elements 452. In certain embodiments, the mobile computing device 436 may include a non-transitory computer-readable storage medium, e.g., memory 434, for storing images captured with the camera 454. In alternative embodiments, the mobile computing device 436 receives image data from an image capture device that is not integrated with the mobile computing device 436 (e.g., from the receiver 110 and/or the online content sources 112). With the camera 454, a user may capture images of displayed objects 460 that are displayed by the display device 160. For example, the displayed objects 460 may include actors and objects displayed in programming content.

In some embodiments, the computer-readable medium 446 can also include an image-processing engine 446(*a*). The image-processing engine 446(*a*) can perform image processing of images captured by the camera 454 to perform image recognition (e.g., facial recognition, product recognition, and/or the like) of the displayed objects 460. The image-processing engine 446(*a*) may analyze the images and generate accessible interface elements using the identified and/or analyzed images. With some embodiments, the image-processing engine 446(*a*) is separate from the application 451. In other embodiments, the application 451 may include the image-processing engine 446(*a*). In some embodiments, the computing device 116 provides the captured images to the receiver 110, and the receiver 110 performs the image processing and analysis (e.g., via the augmentation module 232). In some embodiments, the computing device 116 provides the captured images to the service provider 102 (or another service provider 122), and the service provider performs the image processing and analysis.

Figure 5:
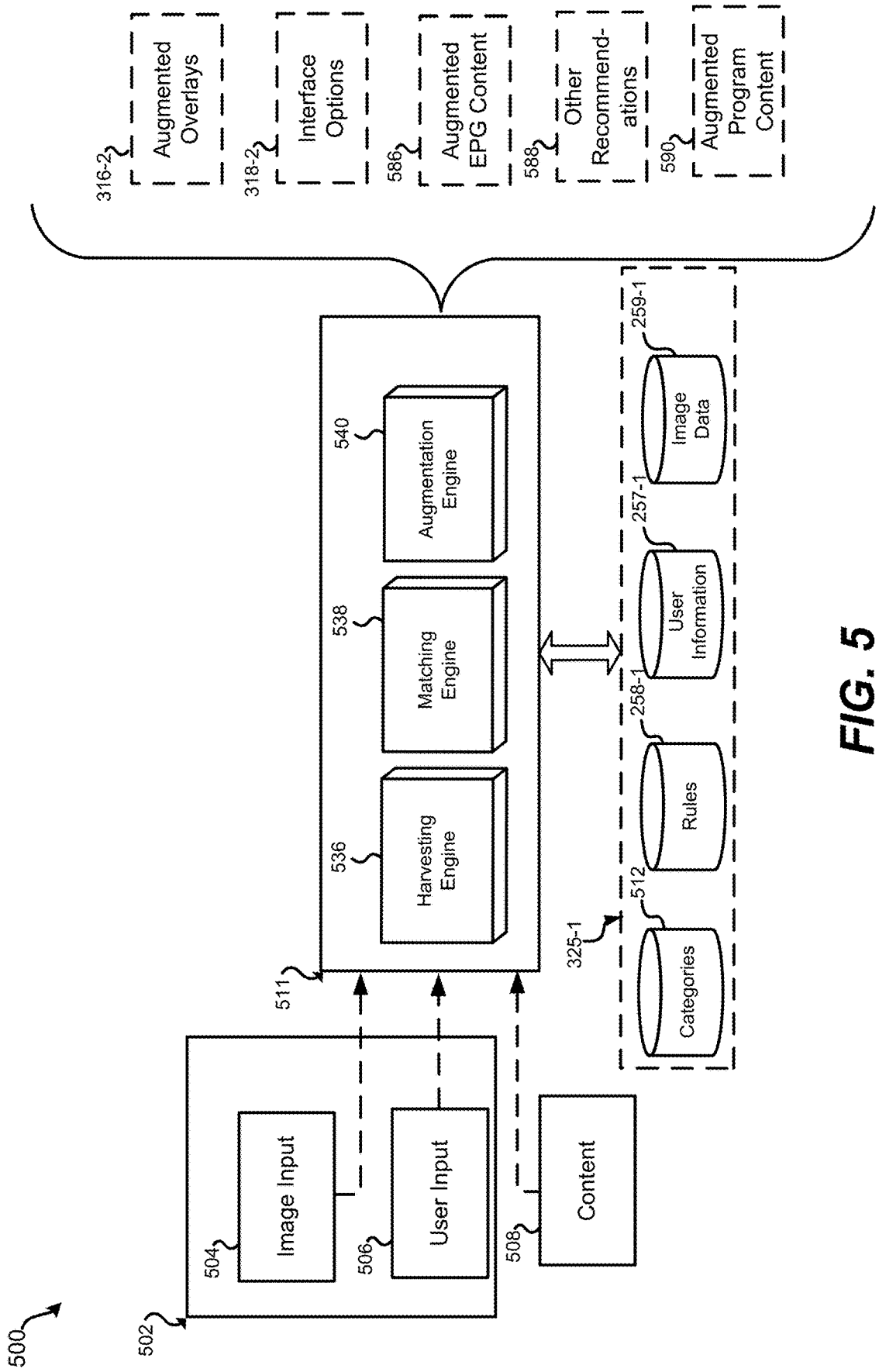
FIG. 5 illustrates a functional diagram of an augmentation system, in accordance with certain embodiments of the present disclosure.

FIG. 5 illustrates a functional diagram of an augmentation system 500, in accordance with certain embodiments of the present disclosure. In some embodiments, the augmentation system 500 may correspond to aspects of the television receiver 110 in conjunction with the computing device 116. As depicted, the augmentation system 500 includes an audiovisual control engine 511. In various embodiments, the audiovisual control engine 511 may correspond to the audiovisual control engine 211, the augmentation module 232, the image processing engine 446(*a*), and/or the application 451. Accordingly, certain embodiments may provide for the receiver 110 and the computing device 116 working in conjunction to provide the features of the augmentation system 500. In other embodiments, the television receiver 110 alone may provide the features of the augmentation system 500.

The audiovisual control engine 511 may be communicatively coupled with interface components and communication channels (e.g., of the television receiver 110, which may take various forms in various embodiments as disclosed herein) configured to receive augmentation input 502. As depicted, the augmentation input 502 may include image input 504. The image input 504 may be captured by the computing device 116, as disclosed herein. The audiovisual control engine 511 may include a harvesting engine 536 configured to aggregate content in order to facilitate augmentation features disclosed herein. For example, the harvesting engine 536 may aggregate, process, format, crop, rescale, and/or otherwise prepare images of the face or the object (or portions of the images where the outer shapes of the face or the objects are defined as boundaries) for further image processing.

The audiovisual control engine 511 may include a matching engine 538. In some embodiments, the matching engine 538 could use facial recognition and/or object recognition to match particular image data to reference image data 259-1. Captured image data may be correlated to reference images 259-1 using any suitable facial or object trait qualifications for correlation. In some embodiments, reference images may be available from a remote source and/or which may be stored locally in a facial image data repository 259-1. The facial data could include any suitable set of facial trait qualifications (e.g., a number of salient facial features and qualifications of the features) for specific individuals in any suitable form for correlation. In some embodiments, the matching engine 538 may link a particular individual's image data to profiles with image data associated with individuals, to identify a known person or a new person. In some embodiments, the reference image data 259-1 may be refined over time as image baselines for a particular individual are developed with additional data captures.

With some embodiments, the matching engine 538 may be configured to match particular viewer information captured via the harvesting engine 536 to one or more categories from a set of categories 512. For example, the matching engine 538 can receive image input 504 corresponding to images captured by the user and/or explicit user input 506 corresponding to user selections of options presented with the augmented context user interface. The matching engine 538 may identify attributes of the users based at least in part on the input 504, 506, and may match the user to one or more categories from a category information repository 512. Any suitable category may be employed to facilitate adjustment features in accordance various embodiments. By way of example, category information may include categories and corresponding criteria to qualify for particular categories such as actors/actresses, directors, the types of television programming (e.g., series, movies, live events), the duration of programs, the genre of television programming (e.g., drama, comedy, documentary), a rating (e.g., G, PG, PG-13, R), and/or the like. In some embodiments, the rules 258 may include criteria for matching a set of indicia of viewer interest to a set of one or more categories. In some embodiments, the rules 258 may include criteria for matching a set of one or more categories to a set of one or more augmentation customizations.

The audiovisual control engine 511 may receive content 508 for potential augmentation, which content 508 could include any one or combination of EPG content, program content, and/or audio content. In some embodiments, the content 508 may include the augmentation input 502 and/or pulled information pertinent to the augmentation input 502. The audiovisual control engine 511 may include an augmentation engine 540 which may be configured to create and/or cause creation of one or more augmentation interface elements disclosed herein. By way of example, in various embodiments, the augmentation engine 540 may create and/or cause creation of one or more of augmented overlays 316, user-selectable interface options 318, augmented EPG content 586, other recommendation notifications 588, augmented program content 590, and/or the like.

In some embodiments, the audiovisual control engine 511 may identify content portions for augmentation by processing the content 508, reading the content 508 or certain portions thereof, and determine portions for augmentation in video segments. In some embodiments, portions of images and/or frames corresponding to an item may be overwritten, e.g., with captured content from the computing device 116 that may correspond to a photo and/or a mask. The item may correspond to a recognized individual or object. The audiovisual control engine 511 may format, rescale, crop, and/or otherwise prepare captured content for insertion into the content stream (e.g., as an overlay). The audiovisual control engine 511 may match the captured content to a face or object in the content stream.

The augmentation engine 540 may include an item identification component that may identify one or more items to be augmented based at least in part on the augmentation input 502. In some embodiments, the item identification component may be configured to examine video content of a content source for one or more items to be augmented (e.g., faces). The augmentation engine 540 may create tag data that defines one or more areas within frames that correspond to certain faces or objects represented within the frames. For example, a dress worn by an actress could be represented within the frames, and the tag data could define the area within the frame that corresponds to the representation of the dress. Such tag data could define the area of interest in any suitable way in various embodiments which could be by way of any one or combination of mattes, masks, pixel identification (which could, for example, include identification of pixel coordinates and ranges thereof to define areas of interest), pixel color component characteristics such as color component values, overlays, and/or the like, allowing for correlation of a user customization to the area of interest in any suitable way. In some embodiments, a processor (such as a main processor, a core processor, digital signal processor, and/or like) may take a definition of the area of interest with respect to one or more reference frames and may perform auto-correlation of related images in a video stream to identify/define the areas of interest in other frames of the video sequence that represent an item of interest. Image characteristics (e.g., color, brightness, etc.) of the area of interest with respect to the reference frame(s) could be measured, quantified, and/or otherwise identified, and matched with measured image characteristics of the other frames to define the area of interest in multiple frames in an image-changing sequence. Accordingly, certain embodiments may allow for handling the complexity of multiple on-screen options by differentiating particular items in dynamic, image-changing content.

Figure 6:
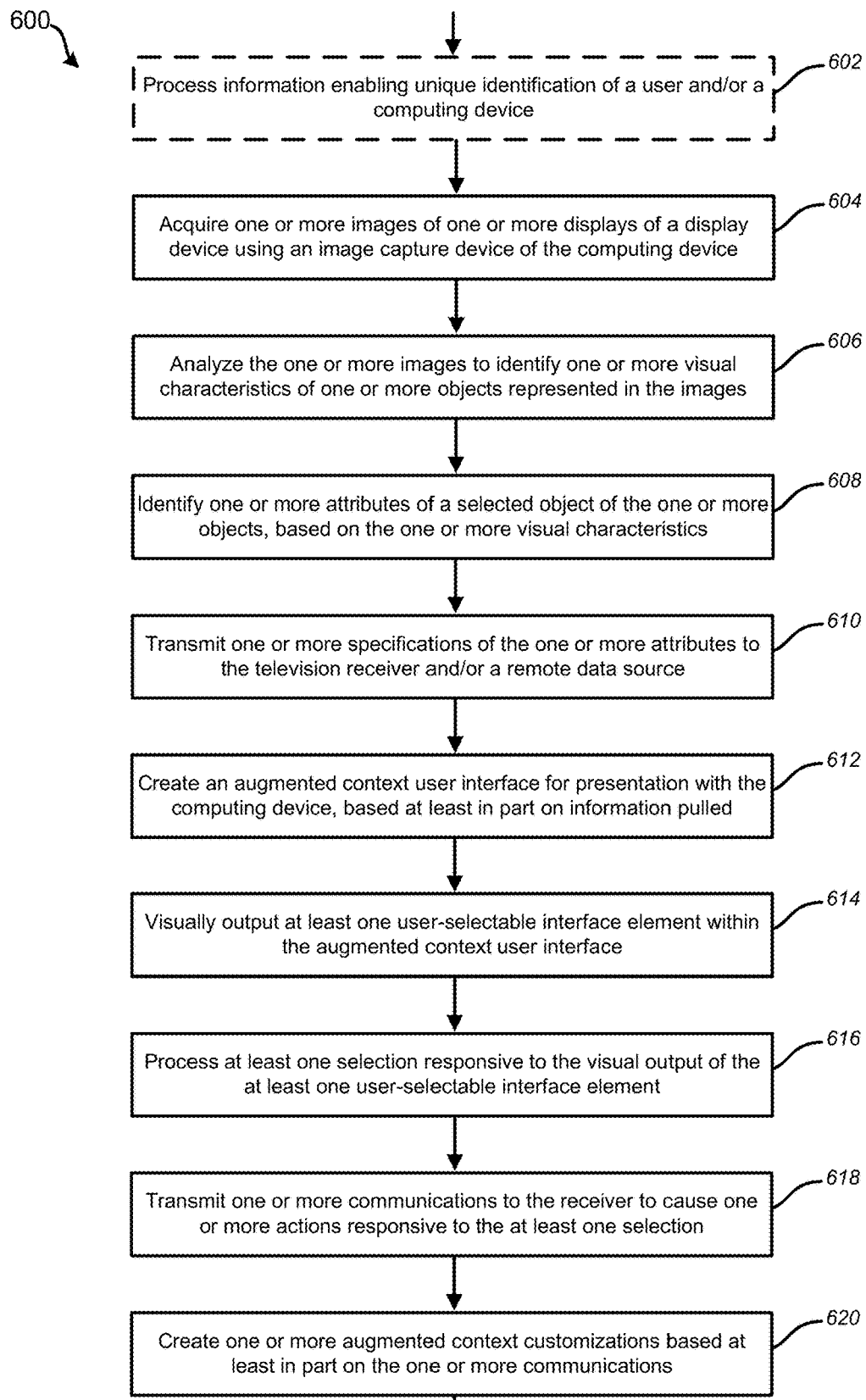
FIG. 6 is a block diagram that illustrates an example method of certain features directed to content discovery based at least in part on augmented context, in accordance with certain embodiments of the present disclosure.

FIG. 6 is a block diagram that illustrates an example method 600 of certain features directed to content discovery based at least in part on augmented context, in accordance with certain embodiments of the present disclosure. According to certain embodiments, the method 600 may begin as indicated by block 602. However, teachings of the present disclosure may be implemented in a variety of configurations. As such, the order of the steps comprising the method 600 and/or other methods disclosed herein may be shuffled or combined in any suitable manner and may depend on the implementation chosen. Moreover, while the following steps may be separated for the sake of description, it should be understood that certain steps may be performed simultaneously or substantially simultaneously.

In some embodiments, as indicated by block 602, information enabling unique identification of a user and/or a computing device 116 may be processed by a receiver 110. In some embodiments, a user may correspond to any user or multiple users associated with a particular account and/or set of one or more television receivers 110. In some embodiments, a user may correspond to a particular user (e.g., a particular user of a household) and could be identified via user selection/input of information through the computing device 116 and/or the receiver 110. Any suitable user-selectable options could be presented to allow for a particular user to input identification information through the television receiver 110, which information may then be transmitted to the service provider system for verification against user information retained by the service provider system. The service provider system may uniquely identify the first user based at least in part on any one or combination of account information, device identification information (e.g., MAC address, IP address, and/or the like), user-provided information, and/or the like.

As indicated by block 604, a set of one or more images of a graphical display of a display device may be acquired by the computing device 116. In some embodiments, a user may use the camera of a computing device 116 to capture one or more images (e.g., as photos or videos) of a program that the user is viewing on a display device. In some embodiments, the computing device 116 may capture images as a result of the television receiver 110 casting programming content to the computing device 116 via wireless signals. For example, the programming content from the television receiver 110 may be indirectly transmitted via a local network (e.g., via Wi-Fi) or directly transmitted to the computing device 116 via a casting device integrated with the television receiver 110 or coupled to the television receiver 110 (e.g., via a dongle). In some embodiments, the computing device 116 may capture images as a result of the television receiver 110 casting programming content to the computing device 116 via a wired connection (e.g., via one or more of HDMI, USB, lightning connector, etc.). Some embodiments may provide for simulcasting such that the same programming that is being displayed on the display device is being displayed on the computing device 116 simultaneously or substantially simultaneously.

As indicated by block 606, the set of one or more images may be analyzed to identify one or more visual characteristics of one or more objects (e.g., individuals or products) represented by the set of one or more images. For example, in some instances, the object represented by the one or more images may correspond to a depiction of an actor or other person in a television program, movie, commercial, and/or the like. In some instances, the object represented by the one or more images may correspond to a depiction of an inanimate object, such as a product represented in a television program, movie, commercial, and/or the like. Such a product could correspond to any number of different types of products, including a vehicle, an article of clothing, accessories, a consumer appliance, furniture, etc. In some embodiments, the visual characteristics of a face or an object may be identified at least in part by shape recognition of shapes corresponding to the face or the object. In some embodiments, the visual characteristics of a face or an object may be identified at least in part by formatting, rescaling, cropping, and/or otherwise preparing images of the face or the object (or portions of the images where the outer shapes of the face or the objects are defined as boundaries) for further image processing. In some embodiments, images captured may be correlated to reference images, which may be available from a remote source and/or which may be stored locally in a facial image data repository. Per some embodiments, in the case of facial recognition, captured image data may be correlated to reference images using any suitable facial trait qualifications for correlation. The facial data could include any suitable set of facial trait qualifications (e.g., a number of salient facial features and qualifications of the features) for specific individuals in any suitable form for correlation. As disclosed herein, a matching engine may link a particular individual's image data to profiles with image data associated with individuals, to identify a known person or a new person. The reference image data may be refined over time as an image baselines for particular individual are developed with additional data captures.

In some embodiments, the computing device 116 may perform the analyzing of the one or more images to identify the one or more visual characteristics of the object represented by the image(s) (e.g., by way of the image processing engine 446(a)). In addition or in the alternative, the computing device 116 may transmit the one or more images so that the analyzing is performed remotely from the computing device 116. For example, the computing device 116 may transmit the one or more images to a backend system in the cloud, so that a service provider may perform the image analysis and identify the one or more visual characteristics. With some embodiments, the remote service may transmit a specification of the one or more visual characteristics to the computing device 116 in return. As another example, the computing device 116 may transmit the one or more images to the television receiver 110, so that the television receiver 110 may perform the image analysis and identify the one or more visual characteristics. With some embodiments, the television receiver 110 may transmit a specification of the one or more visual characteristics to the computing device 116 in return.

As indicated by block 608, based at least in part on the one or more visual characteristics of the object, one or more attributes of a selected object of the one or more objects may be identified. The attributes may correspond to one or more identifiers and/or descriptors of a given object. For example, the system may determine and/or extract data that may be used to query one or more public and/or private data resources to acquire information about the particular object. For example, the system may determine a name of the particular individual recognized. As another example, the system may determine a name (e.g., brand name recognized by distinctive brand marking, such as a badge, a patch, an emblem, and/or the like), model, object type (e.g., a general type, such as article of clothing, shirt, etc.), a set of object sub-types and characteristics (e.g., short-sleeve, button-up, color, collar type, etc.), and/or the like of a particular object recognized.

In some embodiments, the facial and/or inanimate object recognition processes may yield an identification score. Any suitable identification scale may be used in various embodiments. In some embodiments, an identification scale could entail an individual scoring system. Some embodiments may score an individual with a numerical expression, for example, an identification score. For example, in some embodiments, an identification score may be an assessment of a certainty with which the system identifies an individual. By way of example without limitation, an identification scale could include a range of identification scores from 0 to 100, or from 0 to 1,000, with the high end of the scale indicating greater probability. Some embodiments may use methods of statistical analysis to derive an identification score. Various embodiments may determine an identification score based on any one or more suitable quantifiers. An identification score may be based at least in part on the extent to which detected characteristics of the captured data match previously determined characteristics. With an identification score determined, categorizations may be made based on the score. By way of example without limitation, a score correlated to a 75-100% band may be deemed a positive identification of an individual; a score correlated to a 50-75% band may be deemed a possible identification of an individual; a score correlated to a 25-50% band may be deemed a weak identification of an individual; a score below a 50% minimum threshold may be deemed a weak/insufficient identification of an individual; and score of zero may correspond to an unknown individual.

In some embodiments, different actions are taken based on the certainty of the identification. For example, in the cases of a possible or weak identification, the system may present one or more options to the user to elicit user confirmation of one or more possible individuals corresponding to the captured data as the correct individual. In the case of a positive identification, the system may present no such options and may proceed without confirmation. In the cases of a weak identification or no identification, the system may present one or more options to the user to prompt further image capture to facilitate an additional attempt at recognition. Additionally or alternatively, the system may gather contextual information from the receiver about the program being displayed. In some embodiments, the contextual information from the receiver may facilitate the identification (e.g., by providing a list of actors/characters corresponding to a show being displayed). In some embodiments, the contextual information from the receiver may provide criteria for further searching remote online resources in order to facilitate the identification (e.g., by providing a program name, episode, and/or the like which may be used as query criteria searching for a list of actors/characters corresponding to a show being displayed).

In some embodiments, as indicated by block 610, one or more specifications of the one or more attributes of the object may be transmitted, by the computing device 116, to the television receiver 110 and/or a remote data source. The one or more specifications may correspond to query criteria for searching for pertinent information. For example, the system may initiate a keyword Internet search to acquire and aggregate information about the particular individual or object, with one or more identifiers and/or descriptors of the individual or object as at least part of the query criteria. With some embodiments, the transmission of specifications may correspond to the computing device 116 pulling information, from the television receiver 110 and/or the remote data source, that matches the one or more specifications.

In some instances, the information pulled may correspond to one or more of electronic programming guide information, program schedule information, information about one or more recorded programs stored by a recorder. For example, the information pulled may indicate a set of one or more programming events matching the one or more specifications and availability of one or more viewing options for the set of one or more programming events. Hence, upcoming movies involving the recognized actor may be identified. Such identification may be made in conjunction with the electronic programming guide information obtained by the receiver 110. In some instances, programs already recorded by a recorder of the receiver 110 and involving the recognized actor may be identified.

In some embodiments, as indicated by block 612, based at least in part on the information pulled, an augmented context user interface may be created for presentation with the computing device 116. Accordingly, the computing device 116 may present a different presentation of the captured images and additional information pertinent to capture images. In some embodiments, the captured images correspond to images of programming being captured by the computing device 116 and substantially simultaneously being displayed by the computing device 116 display device in real time. The augmented context may include at least one user-selectable interface element generated for presentation with the computing device 116. In some embodiments, the user-selectable interface element may correspond to an option to take an action relating to the object represented by the first set of one or more images.

In some embodiments, the pulled information may be used to provide contextual information about the individuals and objects of the programming displayed on the display device and the computing device 116. For example, an actor may be identified to determine and provide identity information or other related information about the actor (e.g., biographical information, other programs in which the actor plays, trending/latest news regarding the actor, URLs to websites publishing any such information and/or otherwise related to any such information, and/or the like) to the user, which information may be provided with an augmented reality overlay on captured images of the programming displayed on the computing device 116. As another example, in addition or alternative to information about the actor, some embodiments may obtain and provide contextual information about the character shown in the video.

In some embodiments, the action relating to the object may include recording at least one of the set of one or more programming events matching the one or more specifications. Hence, the communication transmitted to the television receiver 110 may cause a recorder to record the at least one of the set of one or more programming events. In some instances, the program of interest may be currently being broadcast, in which case the communication transmitted to the television receiver 110 may cause the recorder to immediately begin recording the at least one of the set of one or more programming events. In other instances where the at least one of the set of one or more programming events is not currently being broadcast but is scheduled for airing in the future, the communication transmitted to the television receiver 110 may cause the recorder to schedule the recording of the at least one of the set of one or more programming events.

As indicated by block 614, a visual output of one or more user-selectable interface elements may be output, by the computing device 116, within the augmented context user interface. The one or more user-selectable interface elements may be output as an overlay on the first set of one or more images and/or a second set of one or more images displayed by the computing device 116. The second set of one or more images may be based at least in part on further image acquisition of the graphical display using the image capture device.

As indicated by block 616, the computing device 116 may process a selection responsive to the outputting of the visual output of at least one of the one or more user-selectable interface elements. As indicated by block 618, a communication may be transmitted, by the computing device 116, to the television receiver 110 to cause the action responsive to the user selection. As indicated by block 620, one or more augmented context customizations may be created, by the receiver 110, based at least in part on the one or more communications.

In some embodiments, one or more user interests may be inferred based at least in part on one or more user selections responsive to the outputting of the visual output of the at least one user-selectable interface element. In some embodiments, the computing device 116 may transmit communications to the television receiver 110 to cause one or more actions based at least in part on the one or more user interests inferred. For example, such actions may correspond to customizing an electronic programming guide so that upcoming programming events are graphically distinguished based at least in part on the one or more user interests inferred. Such actions may correspond to a recorder recording a set of one or more programming events based at least in part on the one or more user interests inferred.

The harvesting engine, for example, may capture data about user selections, viewing history, user queries, selections for recording programs, and/or the like. User preferences may be stored locally by the television receiver or may be stored remotely by the television service provider, and may define the user's viewing preferences regarding content genre, content type, actors, actresses, directors, rating, etc. Compilation of statistics may occur whenever a user interacts with the augmented context user interface. Statistics may be measured and stored by the television receiver and may be based on characteristics of the types of recognized actors, recognized objects, and/or types of requests made.

The receiver 110 and/or the computing device 116 may identify attributes of content based at least in part on responses and/or selections received from the user per the augmented context. The attributes of content could include appearing actors/actresses, directors, the types of television programming (e.g., series, movies, live events), the duration of programs, the genre of television programming (e.g., drama, comedy, documentary), a rating (e.g., G, PG, PG-13, R), and/or the like matched to the images of individuals captured by the user and the selections the user made with respect to the recognized individuals. In some embodiments, the user may be matched to one or more categories from a set of categories. In some embodiments, one or more taxonomies that map particular profile information to particular categories may be used in correlating user profile information with one or more categories.

The receiver 110 and/or the computing device 116 may determine content appropriate for recommendation. Determining whether the content is appropriate for recommendation may include matching the content to a user. Accordingly, if the category of the content matches the inferred categories of interest of the user, then the content may be deemed appropriate for recommendation.

To identify options for accessing the recommended content, it may be determined whether a repeat showing is to be aired. The receiver 110, the computing device 116, and/or the service provider may search for one or more future repeat showings of the program. Further, it may be determined if a staggered broadcast of the television program is available via the television service providers distribution network. One or more requests may be transmitted to content resources to determine if the content resources have the rated content available for retrieval. In some embodiments, rather than transmitting such a request, a schedule of available content may have been previously obtained from one or more content resources. Responses may be received from one or more content resources indicating the availability of the recommended content. Responses from one or more content resources may be analyzed and/or schedules that indicate the availability of television programs from content resources may be analyzed. A content resource may be a local storage medium, which may have recorded the rated content of one or more of the television programs using DVR functionality of the television receiver. A database may be checked to determine if the rated content of the television program was recorded by the television receiver. Multiple other content resources may be available via a network connection, such as previously described public sources, the television service provider, catch-up services, subscription services, television receivers, and other computerized devices, such as illustrated in FIG. 1.

One or more notifications regarding recommended content may be provided to one or more other users. For example, corresponding notifications and user-selectable options may be provided for the user in any or combination of ways disclosed herein. In some embodiments, descriptive content indicative of the recommended content may be provided with one or more user-selectable options via the augmented context user interface and/or via the electronic programming guide to access the recommended content. In the electronic programming guide, the recommended content may be recommended with augmented context, which may include graphically distinguishing the content options in the electronic programming guide (e.g. with highlighting, color differentiation, overlays of supplemental content, such as an image of the actor of interest which may be one basis for the recommended and may correspond to the initial image captured by the user with the computing device, a pop-up with such supplemental content, and/or the like). Recommendations could be inserted into the EPG and/or into the display when the user is channel surfing (i.e., viewing multiple programs for short periods of time less than a certain threshold). Recommendations could be based on the content currently represented in the EPG and/or currently viewing. In some embodiments, the receiver 110 may be configured to automatically record all or a subset of the recommended content and retain the content for a time to allow for the user to consider the recommendation.

A user may select an option to access the recommended content, such as via a remote control and/or the computing device 116 in communication with the receiver 110. The selection received by the television receiver may trigger retrieval of the recommended content from a content resource determined to have the recommended content (and/or may trigger scheduling of retrieval for future recording, streaming, etc. of content anticipated to become available from a content source). Access options may be assessed and retrieval according to a precedence order of availability based at least in part on soonest availability and/or some other appropriate basis.

A content resource is selected from which the recommended content is to be retrieved. In some embodiments, if multiple content resources have the recommended content available, the user may be prompted to select from which content resource to retrieve the recommended content. In some embodiments, one of multiple content resources having the recommended content may be automatically selected (e.g., based on promptness of availability, response time, minimal cost, quality, etc., or based on user preferences). Access to the recommended content may be provided based on the selection (e.g., via downloading, streaming, recording, etc.).

In some embodiments, user actions may be monitored, by the receiver 110 and/or the computing device 116, for implicit indicia of user preferences. For example, it may be determined whether the user accesses the recommended content, which could be correlated to indicia of greater interest. Declining the recommendation could indicate a dislike of the recommendation or simply a lack of interest. Further, it may be determined whether the user not only accesses the recommended content, but also watches all or a significant portion of the content (e.g., based on comparing the portion watched to a length/time threshold). Any one or combination of such actions and determinations may be correlated to indicia of greater or lesser preference in any suitable manner (e.g., based on a scoring scheme).

Figure 7:
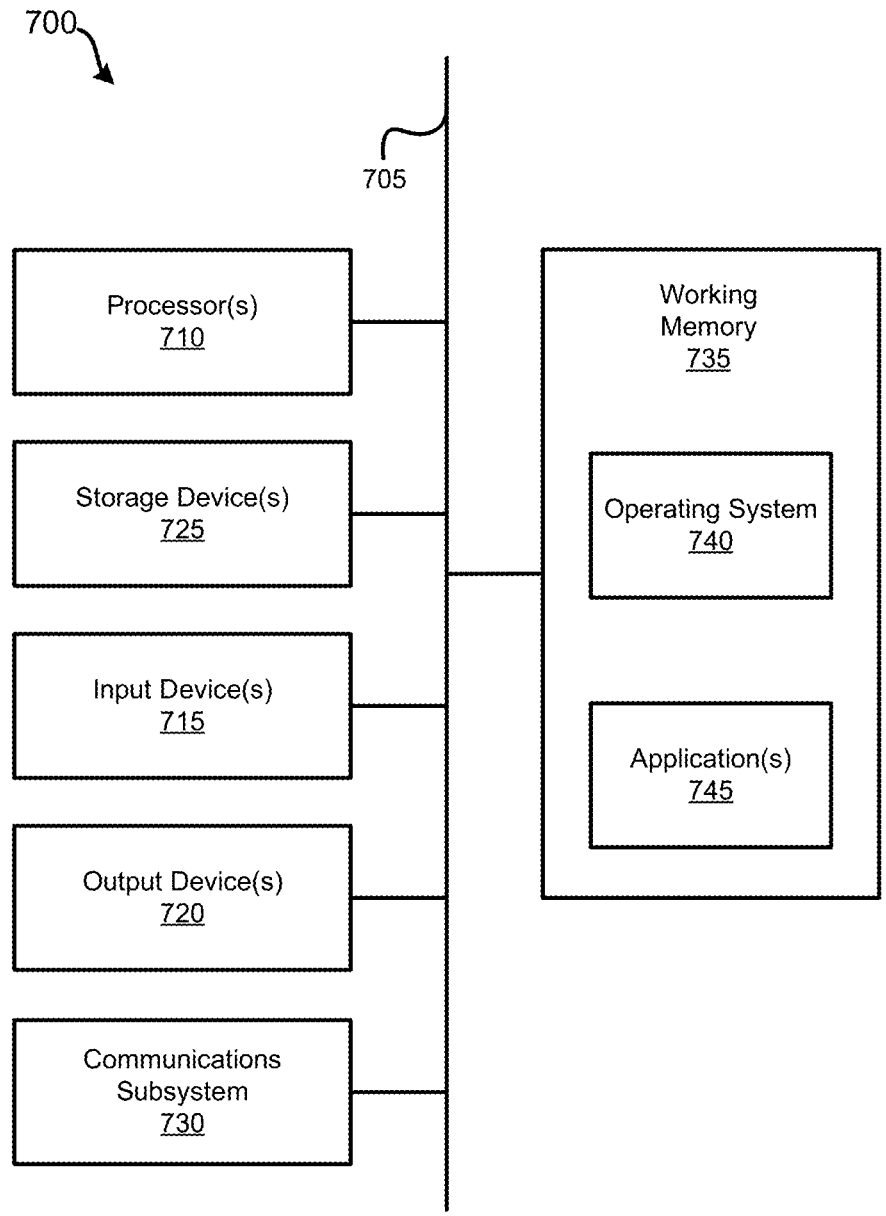
FIG. 7 illustrates an embodiment of a computer system that may be incorporated as part of the described computerized devices, in accordance with certain embodiments of the present disclosure.

A computer system as illustrated in FIG. 7 may be incorporated as part of the previously described computerized devices, such as a television receiver or television service provider system. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:
1. A method comprising:
  acquiring, by a computing device, a first set of one or more images using an image capture device, where:
    the first set of one or more images comprises one or more images of a graphical display, and
    the graphical display is presented by a display device that is different from the computing device;
  analyzing the first set of one or more images to identify one or more visual characteristics of an object represented in the first set of one or more images;
  transmitting specifications corresponding to the one or more visual characteristics of the object to one or more remote data sources and pulling content for a plurality of object options corresponding to the object from the one or more remote data sources;
  causing display of interface elements corresponding to the plurality of object options, and receiving a selection of at least one of the interface elements, wherein the selection corresponds to selecting at least one object option of the plurality of object options;
  generating an augmented reality overlay for presentation with the computer device based at least in part on performing image recognition of the object in the first set of one or more images, where the augmented reality overlay comprises an image of at least one selected object option of the plurality of object options corre- sponding to the object that is generated using the content pulled from the one or more remote data sources;

acquiring, using the image capture device of the computing device, a second set of one or more images comprising one or more images of one or more additional objects, where the second set of one or more images does not include an image of the graphical display; and outputting, by the computing device, a visual output comprising the augmented reality overlay comprising the image of the at least one selected object option of the plurality of object options corresponding to the object as an overlay on a representation of the one or more additional objects.

2. The method as recited in claim 1, where the one or more additional objects are proximate to the image capture device when the second set of one or more images is being captured.

3. The method as recited in claim 1, where the overlay corresponds to a mask.

4. The method as recited in claim 1, where the object corresponds to an individual represented in the graphical display.

5. The method as recited in claim 1, where the object corresponds to a product represented in the graphical display.

6. The method as recited in claim 1, further comprising:
generating at least one selectable interface element for presentation with the augmented reality overlay, wherein the at least one selectable interface element corresponds to an option to take a first action relating to the object represented by the first set of one or more images.

7. A system comprising:
a computing device comprising one or more processors and memory communicatively coupled with and readable by the one or more processors and having stored therein processor-readable instructions which, when executed by the one or more processors, cause the computing device to perform operations comprising:
acquiring a first set of one or more images using an image capture device, where:
the first set of one or more images comprises one or more images of a graphical display, and
the graphical display is presented by a display device that is different from the computing device;
analyzing the first set of one or more images to identify one or more visual characteristics of an object represented in the first set of one or more images;
transmitting specifications corresponding to the one or more visual characteristics of the object to one or more remote data sources and pulling content for a plurality of object options corresponding to the object from the one or more remote data sources;
causing display of interface elements corresponding to the plurality of object options, and receiving a selection of at least one of the interface elements, wherein the selection corresponds to selecting at least one object option of the plurality of object options;
generating an augmented reality overlay for presentation based at least in part on performing image recognition of the object in the first set of one or more images, where the augmented reality overlay comprises an image of at least one selected object option of the plurality of object options corresponding to the object that is generated using the content pulled from the one or more remote data sources;

acquiring, using the image capture device, a second set of one or more images comprising one or more images of one or more additional objects, where the second set of one or more images does not include an image of the graphical display; and outputting a visual output comprising the augmented reality overlay comprising the image of the at least one selected object option of the plurality of object options corresponding to the object as an overlay on a representation of the one or more additional objects.

8. The system as recited in claim 7, where the one or more additional objects are proximate to the image capture device when the second set of one or more images is being captured.

9. The system as recited in claim 7, where the overlay corresponds to a mask.

10. The system as recited in claim 7, where the object corresponds to an individual represented in the graphical display.

11. The system as recited in claim 7, where the object corresponds to a product represented in the graphical display.

12. The system as recited in claim 7, the operations further comprising:
generating at least one selectable interface element for presentation with the augmented reality overlay, wherein the at least one selectable interface element corresponds to an option to take a first action relating to the object represented by the first set of one or more images.

13. One or more non-transitory, machine-readable media having machine-readable instructions thereon which, when executed by one or more processing devices, cause the one or more processing devices to perform operations comprising:
acquiring a first set of one or more images using an image capture device, where:
the first set of one or more images comprises one or more images of a graphical display, and
the graphical display is presented by a display device that is different from the one or more processing devices;
analyzing the first set of one or more images to identify one or more visual characteristics of an object represented in the first set of one or more images;
transmitting specifications corresponding to the one or more visual characteristics of the object to one or more remote data sources and pulling content for a plurality of object options corresponding to the object from the one or more remote data sources;
causing display of interface elements corresponding to the plurality of object options, and receiving a selection of at least one of the interface elements, wherein the selection corresponds to selecting at least one object option of the plurality of object options;
generating an augmented reality overlay for presentation based at least in part on performing image recognition of the object in the first set of one or more images, where the augmented reality overlay comprises an image of at least one selected object option of the plurality of object options corresponding to the object that is generated using the content pulled from the one or more remote data sources;
acquiring, using the image capture device, a second set of one or more images comprising one or more images of one or more additional objects, where the second set of one or more images does not include an image of the graphical display; and outputting a visual output comprising the augmented reality overlay comprising the image of the at least one selected object option of the plurality of object options corresponding to the object as an overlay on a representation of the one or more additional objects.

14. The one or more non-transitory, machine-readable media as recited in claim 13, where the one or more additional objects are proximate to the image capture device when the second set of one or more images is being captured.

15. The one or more non-transitory, machine-readable media as recited in claim 13, where the overlay corresponds to a mask.

16. The one or more non-transitory, machine-readable media as recited in claim 13, where the object corresponds to an individual represented in the graphical display.

17. The one or more non-transitory, machine-readable media as recited in claim 13, where the object corresponds to a product represented in the graphical display.

* * * * *